United States Patent
McManus et al.

(10) Patent No.: US 6,494,343 B2
(45) Date of Patent: Dec. 17, 2002

(54) FLUID STORAGE AND DISPENSING SYSTEM FEATURING EX-SITU STRAIN GAUGE PRESSURE MONITORING ASSEMBLY

(75) Inventors: James V. McManus, Danbury, CT (US); Michael J. Wodjenski, New Milford, CT (US); Edward E. Jones, Bridgewater, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/783,919

(22) Filed: Feb. 15, 2001

(65) Prior Publication Data

US 2002/0134794 A1 Sep. 26, 2002

(51) Int. Cl.$^7$ .................................................. F17C 11/00
(52) U.S. Cl. ............................... 222/55; 222/23; 141/3; 141/20; 141/95
(58) Field of Search ............................ 222/1, 3, 23, 55; 141/3, 20, 95; 73/700, 701, 719–721, 725, 726

(56) References Cited

U.S. PATENT DOCUMENTS

| 3,698,249 A | * | 10/1972 | Weaver | 73/398 R |
| 4,257,260 A | * | 3/1981 | Beatson et al. | 73/119 A |
| 4,420,980 A | * | 12/1983 | Dunemann et al. | 73/730 |
| 4,546,649 A | * | 10/1985 | Kantor | 73/168 |
| 4,606,497 A | * | 8/1986 | Heimovics, Jr. | 236/92 R |
| 5,179,981 A | * | 1/1993 | Hicks et al. | 141/4 |
| 5,413,159 A | * | 5/1995 | Olney et al. | 152/418 |
| 5,493,903 A | * | 2/1996 | Allen | 73/149 |
| 5,505,092 A | * | 4/1996 | Kowalski | 73/730 |
| 5,518,528 A | | 5/1996 | Tom et al. | |
| 5,883,305 A | * | 3/1999 | Jo et al. | 73/146.5 |
| 6,089,027 A | | 7/2000 | Wang et al. | 62/48.1 |
| 6,101,816 A | | 8/2000 | Wang et al. | 62/48.1 |
| 6,124,787 A | * | 9/2000 | Isakov et al. | 340/448 |
| 6,257,000 B1 | * | 7/2001 | Wang | 62/48.1 |

OTHER PUBLICATIONS

Hottinger Baldwin Messtechnik, (HBM), Wagetechnik GmbH, "Strain Gauges and Accessories" Booklet, pp. 2–63.

* cited by examiner

Primary Examiner—J. Casimer Jacyna
(74) Attorney, Agent, or Firm—Steven J. Hultquist; Margaret Chappuis; William Ryann

(57) ABSTRACT

A fluid containment system including a vessel for containing a fluid that is discharged from the vessel in use or operation of the system. A pressure monitoring assembly including a strain-responsive sensor is disposed on an exterior wall surface of the vessel, to sense dynamic strain on the wall surface of such vessel that is incident to discharge of fluid from the vessel, and to responsively output a pressure-indicative response. Such arrangement is particularly useful in application to fluid storage and dispensing vessels containing interiorly disposed pressure regulator assemblies and holding liquefied gases or compressed gases, e.g., for use in semiconductor manufacturing operations.

137 Claims, 12 Drawing Sheets

FLUID STORAGE AND DISPENSING SYSTEM FEATURING EX-SITU STRAIN GAUGE PRESSURE MONITORING ASSEMBLY

BACKGROUND OF THE INVENTION

1. Field of the Invention

This invention relates to ex-situ monitoring of pressure in a closed vessel containing fluid, and in a preferred aspect to ex-situ monitoring of pressure in a fluid storage and dispensing system from which a gas or liquid can be dispensed for use in the manufacture of semiconductor devices and materials.

2. Description of the Related Art

In a wide variety of industrial processes and applications, there is a need for a reliable source of process fluid(s).

For example, a safe, reliable and efficient fluid supply source is desirable in the fields of semiconductor manufacturing, ion implantation, manufacture of flat panel displays, medical intervention and therapy, water treatment systems, emergency breathing systems, welding operations, space-based delivery of liquids and gases, among others.

U.S. Pat. No. 6,089,027 issued Jul. 18, 2000 and U.S. Pat. No. 6,101,816 issued Aug. 15, 2000, both in the names of Luping Wang and Glenn M. Tom, describe a fluid storage and gas dispensing system including a storage and dispensing vessel for holding a fluid, such as for example a pressurized liquid whose vapor constitutes the fluid to be dispensed, or alternatively a compressed gas. The vessel includes an outlet port that is coupled to a dispensing assembly. The dispensing assembly may be of various forms, e.g., including a valve head comprising a dispensing valve and an outlet for selective discharge of gas from the vessel.

In the Wang et al. system, a fluid pressure regulator is associated with the outlet port and is positioned upstream of dispensed gas flow control means such as the aforementioned dispensing valve. The fluid pressure regulator is preferably at least partially interiorly disposed in the vessel, and most preferably is fully interiorly disposed therein, to minimize the possibility of impact and environmental exposure in use, as well as to permit a single weld or seam to be employed at the outlet port, to seal the vessel.

The regulator is a control device that is set at a predetermined pressure level, to dispense gas from the cylinder at such pressure level. In one embodiment of the aforementioned fluid storage and dispensing systems, a set point regulator is utilized and is pre-set at a single set point prior to its installation in the vessel. The pressure level set point may be superatmospheric, subatmospheric or atmospheric pressure, depending on the dispensing conditions, and the mode of gas discharge from the vessel. The vessel may optionally contain a physical adsorbent material having a sorptive affinity for the fluid contained in the vessel.

Such "regulator in a bottle" designs, including arrangements employing a double-stage (or multi-stage) fluid pressure regulator, optionally with a particulate filter assembly, provide an effective means and method for storage and dispensing of liquids and gases that are contained in the vessel at elevated pressure, e.g., at a pressure of from about 50 psig to about 5000 psig. The set pressure regulator is readily disposed in the interior volume of the storage and dispensing vessel, and effectively utilized to regulate the pressure and flow rate of discharged gas deriving from the contained fluid, in the fluid dispensing operation.

The regulator set point pressure is typically below 50 psig. Since the vessel is sealed in use, there is an inability to precisely measure the fluid remaining in the vessel as the dispensing operation proceeds.

Accordingly, while the "regulator in a bottle" fluid storage and dispensing system provides a safe and effective means for supplying fluids of widely varying type in industrial process applications, it would be desirable to provide a means and method of measuring internal pressure of the fluid in the storage and dispensing vessel.

Such internal pressure measurement would permit ready determination of the vessel's fluid content and the approach to exhaustion of the vessel, but the fixed set point of the regulator in the vessel port prevents internal fluid pressure in the vessel from being directly measured exteriorly of the vessel. Although a pressure sensor or transducer element could be disposed in the interior volume of the vessel, in order to be functional, such element would have to be coupled to exterior monitoring means. This in turn requires a feedthrough in the valve head of the vessel, which requires leak-tight sealing and creates an additional leak path as a potential failure mode of the vessel.

In the absence of any means or method to determine internal pressure of the fluid in the sealed vessel of the fluid storage and dispensing system, there is corresponding concern on the part of the user that the vessel may be underfilled or overfilled for a given fluid-consuming operation.

There is also the possibility that the user will prematurely remove the fluid storage and dispensing vessel from the process facility before its full capacity is exhausted, in an effort to avoid "running dry," thereby underutilizing the fluid and wasting the fluid residuum in the vessel. In the case of many high-cost chemical reagents, such as those used in semiconductor fabrication, such underutilization results in a severe economic penalty that may very markedly affect the profitability of the industrial operation in which the dispensed fluid is being used.

In addition, if change-out of the fluid storage and dispensing vessels occurs only when the vessels are completely exhausted of the original fluid charge, without a reliable system for monitoring the internal pressure and hence the amount of fluid in the vessel, then significant loss of process equipment uptime may occur, as the vessels in the process system run dry. The system then must be idled to permit the change-out of the exhausted vessel. This non-monitored condition of the vessels is particularly problematic where a number of fluid supply vessels are employed to simultaneously supply different gases to a gas-consuming process unit. Such disruption of the gas supply incident to unexpectedly premature exhaustion of the fluid in the containment vessel can have significant negative impact on the efficiency and profitability of the overall process facility in which the fluid storage and dispensing system is employed.

It would be a significant advance in the art to provide a means and method of non-invasively monitoring the internal pressure of a sealed vessel containing fluid, which is amenable to use with fluid storage and dispensing systems of the type described in U.S. Pat. Nos. 6,089,027 and 6,101,816.

SUMMARY OF THE INVENTION

The present invention relates to a system for non-invasively monitoring the internal pressure of a closed vessel containing fluid, e.g., in a storage and dispensing system including a sealed fluid-containing vessel for supplying fluid useful in the manufacture of semiconductor products.

In one aspect, the present invention relates to a fluid containment system, comprising:

a vessel constructed and arranged to retain a fluid therein and to discharge fluid from the vessel in use or operation of the system;

such vessel including a vessel wall with an interior surface in contact with fluid contained in the vessel, and an exterior surface; and a pressure monitor including a strain-responsive sensor disposed on the exterior surface and outputting a pressure-indicative response as fluid is discharged from the vessel, wherein pressure of the fluid in the vessel correspondingly changes with such discharge.

In one embodiment of the present invention, the outputted pressure-indicative response is strain (or deformation) in the vessel wall of said fluid-containing vessel. Pressure of the fluid contained by the vessel applies stress on the vessel wall of the vessel and subsequently causes strain/deformation in the vessel wall.

The resulting strain/deformation of the vessel wall in accordance with the invention is detected by a sensing device, such as an electrical resistance strain gauge, a piezoelectric element, a strain-sensitive calorimetric element, or a strain-sensitive matrix that contains latent strain-mediated chemical reactants.

A preferred strain-detection device useful in the practice of the present invention is an electrical resistance strain gauge assembly, which comprises one or more strain-measuring grids. The strain-measuring grid is subject to the same or proportional degree of strain/deformation as the vessel wall. The electrical resistance change in the strain-measuring measuring grid thereby enables monitoring of the strain and deformation, and correlative outputting of a signal indicative of pressure in the vessel.

In a specific preferred embodiment of the present invention, a Wheatstone bridge circuit is configured for accurately detecting and measuring electrical resistance change of the above-described strain-measuring grid. The Wheatstone bridge circuit incorporates the strain-measuring grid and achieves a balance of voltage in the circuit. Whenever the electrical resistance of the strain-measuring grid changes due to strain, even to a very small degree, the balance of the circuit is upset, and a resulting voltage difference scaled to the associated strain can be measured.

Such Wheatstone bridge circuit can be variously configured in any suitable manner. For example, the Wheatstone bridge circuit can be of a type incorporating a single strain-measuring grid and three standard non-measuring resistors; alternatively, it can incorporate two strain-measuring grids in adjacent bridge arms and two standard non-measuring resistors. In a preferred configuration, the Wheatstone bridge device comprises a "full bridge-configuration," wherein all four resistors of such Wheatstone bridge circuit are active strain-measuring grids. Additionally, multiple (redundant) sensor configurations, including but not limited to thermistor and amplifier componentry, may be employed to improve sensitivity, accuracy and reliability.

In another aspect, the invention relates to a fluid storage and dispensing apparatus, comprising:

a fluid storage and dispensing vessel enclosing an interior volume for holding a fluid, wherein the vessel includes a fluid discharge port for discharging fluid from the vessel;

a pressure regulating element in the interior volume of the fluid storage and dispensing vessel, arranged to flow fluid therethrough to the fluid discharge port at a set pressure for dispensing thereof; and a pressure monitor including a strain-responsive sensor disposed on an exterior surface of the vessel and outputting a pressure-indicative response as fluid is discharged from the vessel, wherein pressure of the fluid in the vessel correspondingly changes with such discharge.

Yet another aspect of the invention relates to a method of monitoring pressure of a fluid in a vessel during use or operation involving discharge of fluid from the vessel, such method comprising:

sensing strain on a wall of the vessel; and generating an output indicative of pressure of the fluid in the vessel correlative to the sensed strain of said vessel.

A still further aspect of the invention relates to a method of fluid management, comprising:

confining a fluid in a fluid storage and dispensing vessel including a vessel wall enclosing an interior volume for holding the fluid, wherein the vessel includes a fluid discharge port for discharging fluid from the vessel, and a pressure regulating element in the interior volume of the fluid storage and dispensing vessel, arranged to flow fluid therethrough to the fluid discharge port at a set pressure for dispensing thereof;

sensing strain of such vessel wall that is indicative of pressure of the fluid in the vessel; and generating an output indicative of pressure of the fluid in the vessel correlative to the sensed strain of such vessel wall.

Other aspects, features and embodiments in the invention will be more fully apparent from the ensuing disclosure and appended claims.

DETAILED DESCRIPTION OF THE INVENTION AND PREFERRED EMBODIMENTS THEREOF

The disclosures of U.S. Pat. No. 6,101,816 issued Aug. 15, 2000 in the names of Luping Wang and Glenn M. Tom for "FLUID STORAGE AND GAS DISPENSING SYSTEM", U.S. Pat. No. 6,089,027 issued Jul. 18, 2000 in the names of Luping Wang and Glenn M. Tom for "FLUID STORAGE AND DISPENSING SYSTEM", and U.S. Pat. No. 5,518,528 issued May 21, 1996 in the names of Glenn M. Tom and James V. McManus for "STORAGE AND DELIVERY SYSTEM FOR GASEOUS HYDRIDE, HALIDE, AND ORGANOMETALLIC GROUP V COMPOUNDS" are hereby incorporated herein by reference for all purposes in their respective entireties.

Figure 1:
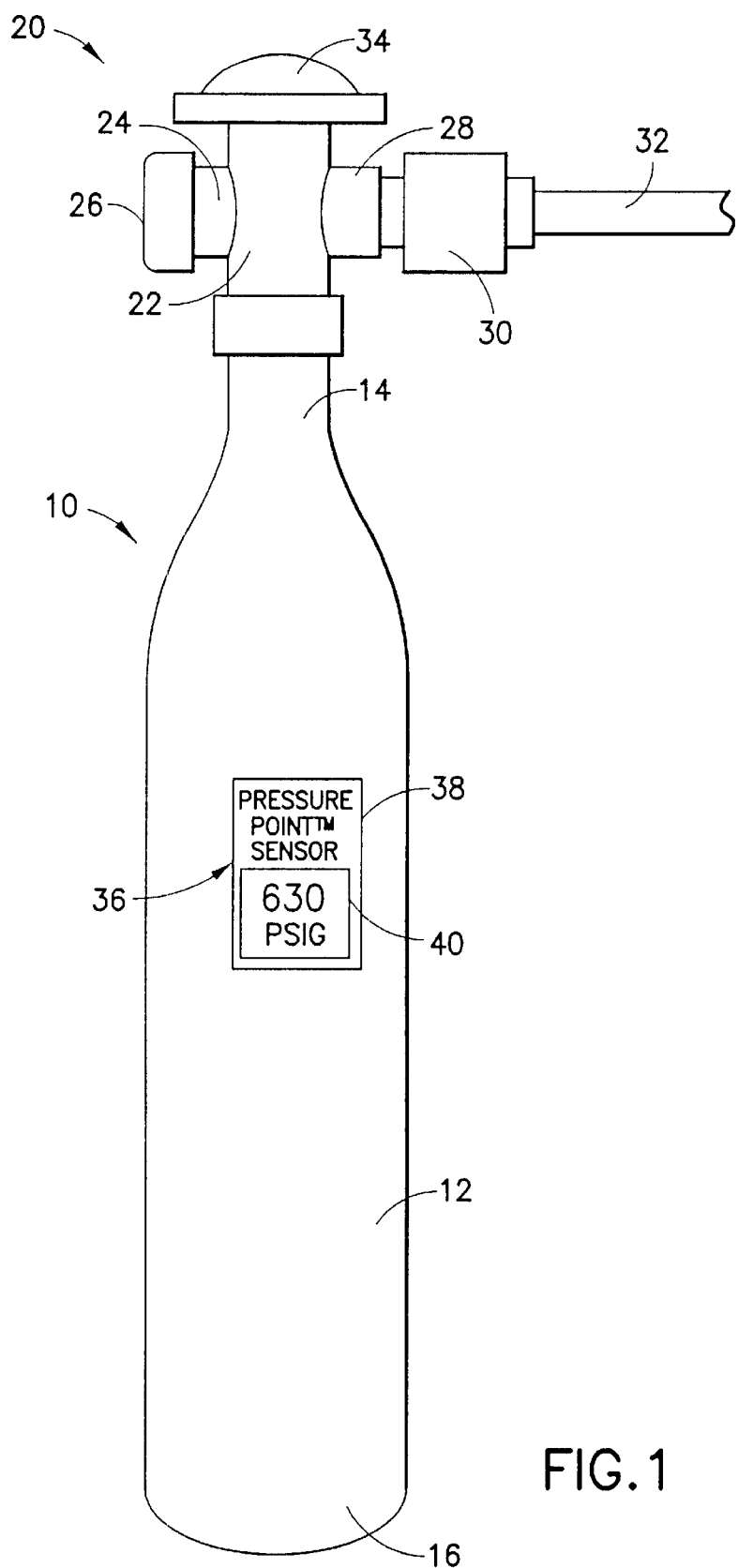
FIG. 1 is an elevation view of a fluid storage and dispensing apparatus according to one embodiment of the present invention.

Referring to the drawings, FIG. 1 is a schematic cross-sectional elevation view of a fluid storage and dispensing apparatus 10 according to one embodiment of the present invention.

The fluid storage and dispensing apparatus 10 includes a storage and dispensing vessel 12 comprising an elongated cylindrical sidewall that together with the floor 16 corporately encloses the interior volume of the vessel. The side wall and floor may be formed of any suitable material of construction, e.g., metal, gas-impermeable plastic, fiber-resin composite material, or a composite material such as nickel-lined carbon steel, etc., as appropriate to the gas to be contained in the vessel, the end use environment of the apparatus, and the pressure levels to be maintained in the vessel in storage and dispensing use.

At its upper end, the vessel features a neck 14 defining a port opening bounded by the inner wall of the neck 14. The inner wall may be threaded or otherwise complementarily configured to matably engage therein a valve head 20 including a valve body 22 which is complementarily threaded or otherwise configured for mating engagement with the inner wall.

In such manner, the valve head 20 is engaged with the vessel 12 in a leak-tight manner, to hold fluid therein in the interior volume at the desired storage conditions.

The valve head body 22 is formed with a passage therein for dispensing of fluid deriving from fluid in the vessel 12, such fluid dispensing passage communicating with the fluid discharge port 28. The fluid discharge port 28 is connected by coupling 30 to the fluid supply conduit 32, as shown. Fluid supply conduit 32 in turn constitutes a component of fluid flow circuitry that interconnects the fluid storage and dispensing apparatus 10 with a fluid-consuming process such as a semiconductor manufacturing tool.

The valve head body 22 includes a fluid fill port 24. The fill port in the view shown is capped by a closure member 26, after filling of the vessel 12 with fluid has taken place, to protect the fill port from contamination or damage.

The valve head body contains a valve element coupled with the hand wheel 34, for selective manual opening of the valve to flow gas through a fluid dispensing passage in the valve head from the vessel 12 to the fluid discharge port 28, or alternatively for manual closure of the valve to terminate flow of fluid from the fluid dispensing passage to the fluid discharge port.

In place of the hand wheel valve actuation element, there may be provided an automatic valve actuator, such as a pneumatic valve actuator, an electromechanical valve actuator, or other suitable means for automatically opening and closing the valve in the valve head.

The valve head body 22 is coupled with a fluid regulator assembly (not shown in FIG. 1) that is internally disposed in the interior volume of the regulator, so that fluid discharged from the vessel 12 flows through the internally disposed regulator and then through a valve and associated flow passages in the valve head 22 to the fluid discharge port and into line 32. The fluid in the fluid storage and dispensing apparatus 10 therefore is dispensed at a pressure determined by the pressure set point of the regulator in the vessel 10, when the flow control valve in the valve head is opened.

The fluid in the fluid storage and dispensing vessel 12 may be any suitable fluid medium at any appropriate fluid storage conditions, e.g., a high pressure gas or alternatively a liquid, at the set point pressure determined by the internal fluid pressure regulator, as the fluid to be dispensed. The fluid can for instance be a high-pressure gas or a liquefied gas, e.g., at a pressure of from about 50 psig to about 5000 psig or even higher.

In a specific embodiment, the fluid contained in the fluid storage and dispensing vessel of the invention comprises a hydride fluid for semiconductor manufacturing operations. Examples of hydride fluids of such type include arsine, phosphine, stibine, silane, chlorosilane, and diborane. Other fluids useful in semiconductor manufacturing operations that can be stored in and dispensed from the vessel, include, without limitation, acid gases such as hydrogen fluoride, boron trichloride, boron trifluoride, hydrogen chloride, halogenated silanes (e.g., $SiF_4$) and disilanes (e.g., $Si_2F_6$), etc., having utility in semiconductor manufacturing operations as halide etchants, cleaning agents, source reagents, etc.

The storage and dispensing vessel 12 shown in FIG. 1 can be in an empty condition in its interior volume prior to filling of the vessel with the fluid to be dispensed. Alternatively, the interior volume of the vessel can contain sorbent material(s) to remove impurities or contaminants from the fluid being stored in the vessel, or to sorptively retain the fluid being stored, for subsequent release (desorption) in the dispensing operation.

The vessel 12 in the FIG. 1 embodiment has mounted on an exterior surface of the vessel wall a pressure monitor 36 including a sensor module 38 and a display module 40. The sensor module 38 comprises a strain-responsive sensor that measures pressure in the interior volume of the vessel by sensing mechanical strain or deformation of the vessel wall as a function of pressure in the interior volume of the vessel.

As used herein, the term "exterior surface" in reference to the vessel wall to which the strain-gauge sensor is operatively coupled, is intended to be broadly construed to include any surface that exhibits detectible strain or deformation in response to change in pressure of the vessel, and permits an associated strain-gauge sensor to provide a signal correlative of the pressure of the fluid in the vessel.

The internal pressure exerted on the vessel wall by fluid contained by the vessel will cause mechanical strain or deformation in the vessel wall. Such internal fluid pressure can be measured by monitoring the strain of the wall and correlatively generating an output signal indicative of the pressure of the fluid contents in the vessel. The pressure-measuring signal then can then be converted to true pressure value for the fluid in the vessel. The mechanism of pressure-induced strain on the vessel wall of a thin-walled vessel and its quantitative correlation with the applied pressure will be explained more thoroughly hereinafter.

Various strain-responsive sensor arrangements can be employed for monitoring the pressure-induced strain of the vessel wall, using various strain-measuring techniques, including but not limited to electrical resistance strain gauges, piezoelectric elements, strain-sensitive calorimetric strips providing a colorimetric pressure level-specification, strain-sensitive matrices containing microballoons filled with a chemical reactant that upon strain-induced rupture of the microballoons effects a colorimetric change chemical reaction, etc.

Figure 2:
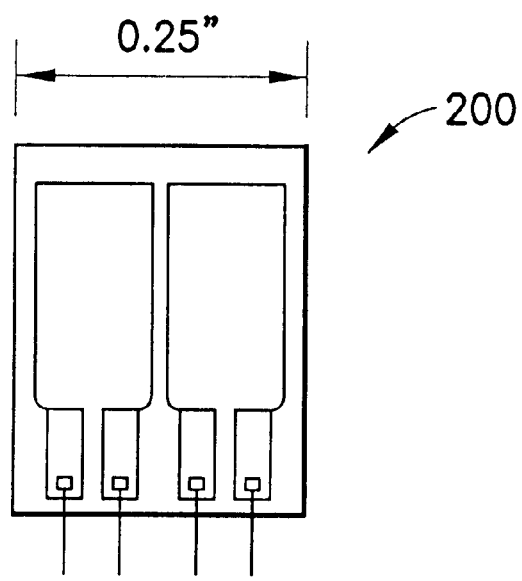
FIG. 2 is a front elevation view of a strain-responsive sensor element of a pressure monitor of the FIG. 1 apparatus.

In a preferred embodiment of the present application, such strain-responsive sensor comprises an electrical resistance strain gauge assembly. FIG. 2 is a front elevation view of one such electrical resistance strain gauge sensor 200, commercially available as BLH Type FAE4-A6257J-120-S6EL Strain Gauge manufactured by BLH Electronics, Inc. Canton, Mass. Such sensor is of advantageously small size, with length and width of approximately 0.25 inch. Other commercially available electrical resistance strain gauge sensors that are usefully employed in specific embodiments of the invention include the HBM Type 1-LY11-6/350 Strain Gauge manufactured by Hottinger Baldwin Measurements, Inc. Marlboro, Mass.

The sensor of the type shown in FIG. 2 is usefully employed in a pressure monitor assembly 36 of the type shown in FIG. 1 including a sensor module 38 and a display module 40. The sensor module 38 (FIG. 1) includes the electrical resistance strain gauge sensor element 200 (FIG. 2) and the display module includes outputting components, such as a display element providing a "visual read" capability for the pressure level sensed by the sensor, associated integrated circuitry operatively coupling the sensor and the display element and a power supply, such as a battery or other electrochemical power source, photovoltaic cell, or other power supply components.

The display module can also optionally, or alternatively, comprise a radio-frequency transponder system that is arranged to transmit the pressure readout of the sensor module to a remote location. In one specific arrangement, such transponder system can comprise multiple transmitters attached to respective individual fluid vessels for transmitting pressure data of each individual fluid vessel as radio-frequency signals. The transponder system also comprises one or more receivers at remote location(s) for receiving the radio-frequency signals sent by the transmitter.

Such receiver(s) may be connected to a computer terminal of a computerized information system for centralized data collection and analysis. Such information system may comprise a computer network, with multiple computer terminals at different locations, i.e., an intranet, local area network, wide area network, a computer network interfaced with the world wide web or other such network as known to those skilled in the art. Each computer terminal can be connected to one or more receivers to collect inputted data relating to internal pressures of individual fluid vessels. Such network-based information system facilitates systematic inventory monitoring and management by coordinating inventory control at multiple remote locations.

Alternatively, such receiver(s) may be connected to personal digital assistant, or other device for small-scale data collection and management.

The transponder system may also comprise a microprocessor for independent data interpreting and analyzing and a display means for data outputting. Such microprocessor may also store in its memory identifying information for each specific vessel, so that a worker in a semiconductor manufacturing plant or other facility using a multiplicity of such monitored vessels can receive real-time information for each of any number of vessels in the facility, with an identification of the vessel in each case. Such vessel identification may include bar coding, or other indicia that specify the vessel associated with a given pressure reading.

The receiver device, and/or the display in the monitoring assembly, may also include hardware/software capability of extrapolating the declination of the pressure of the contained fluid in a monitored vessel, to provide a read-out or other output of the remaining service life of the vessel (to exhaustion of the charge of fluid therein), the estimated date/time of exhaustion or needed change-out at the extrapolated fluid consumption rate, etc.

Optionally, additionally or alternatively, the monitoring assembly can be constructed to provide an alarm output indicating a predetermined approach to vessel exhaustion, of a visual, sonic, tactile or other sensorily perceivable character. As an illustrative example, the alarm can be an audible alarm at a first interval of repetition when a vessel is approaching 80% exhaustion, and a second audible alarm (of a same or different frequency/pitch) at a second interval of repetition when the vessel is approaching 95% exhaustion.

The pressure monitoring assembly including the strain-gauge sensor can be arranged for continuous monitoring of the vessel to which the monitoring assembly is operatively coupled. Alternatively, the strain-gauge sensor can be arranged for intermittent or cyclic read-out of pressure of the vessel, to minimize power consumption of the monitoring assembly.

Figure 3A:
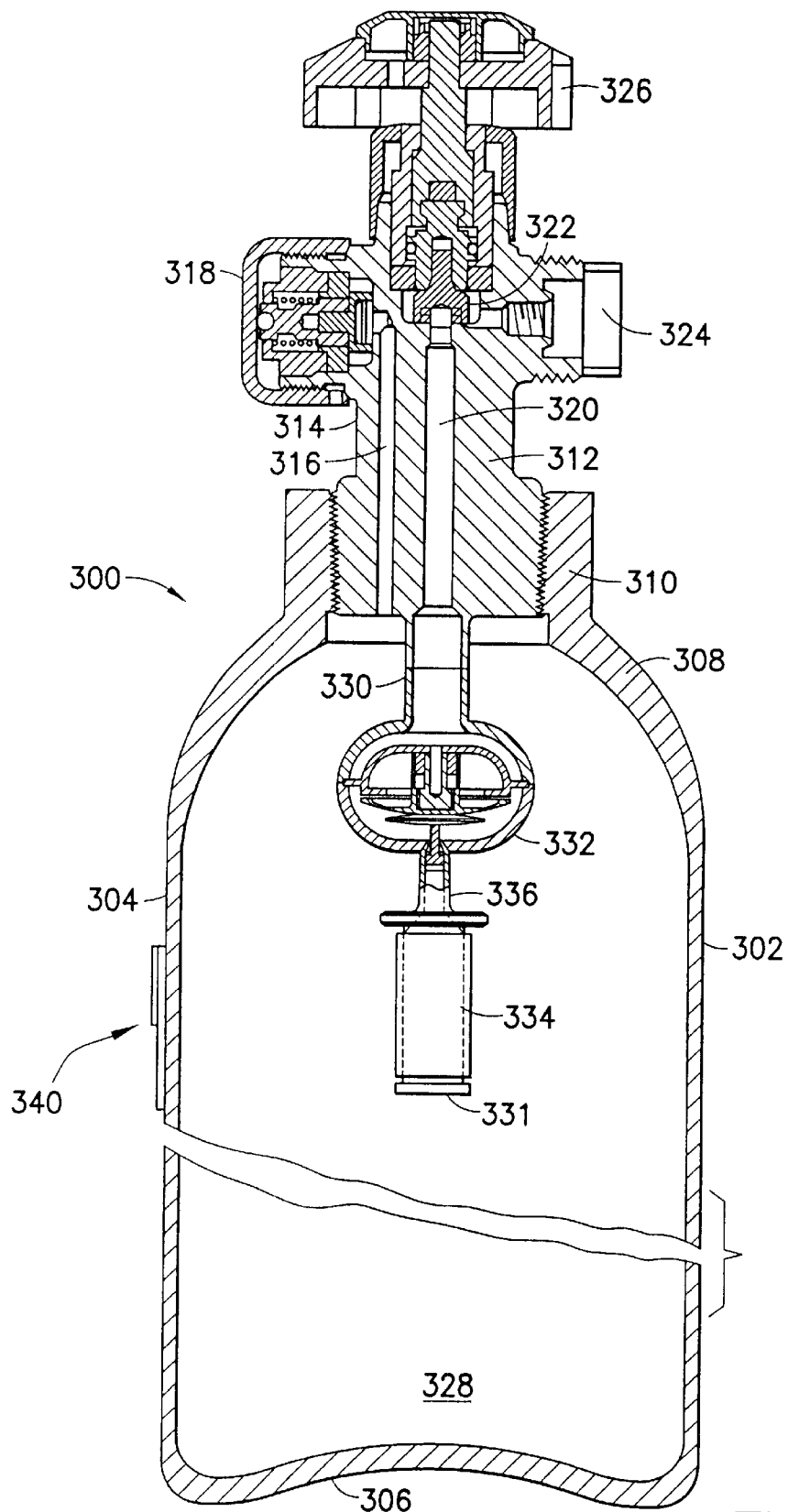
FIG. 3A is a schematic cross-sectional elevation view of a fluid storage and dispensing system according to another embodiment of the present invention, showing the details of the internal structure thereof, including a pressure regulator interiorly disposed in the vessel.

FIG. 3A is a schematic cross-sectional elevation view of a fluid storage and dispensing system 300 according to another illustrative embodiment of the present invention. The system 300 includes a fluid storage and dispensing vessel 302 of generally cylindrical form, with cylindrical side wall 304 closed at its lower end by floor member 306. At the upper end of the vessel is a neck 308 including a cylindrical collar 310 defining and circumscribing a top opening of the vessel. The vessel wall, floor member and neck thereby enclose an interior volume 328, as shown.

At the neck of the vessel, a threaded plug 312 of the valve head assembly 314 is threadably engaged with the interior threaded opening of the collar 310. The valve head assembly 314 includes a central fluid flow passage 320 joined in fluid flow communication with a central working volume cavity in the valve head assembly. The central working volume cavity in turn is joined to outlet 324, which may be exteriorly threaded or otherwise constructed for attachment of a connector and associated piping, conduit, etc. thereto.

Disposed in the central working volume cavity is a valve element 322 that is joined to a hand wheel 326 in the embodiment shown, but alternatively may be joined to an automatic valve actuator or other controller or actuating means.

The valve head assembly 314 also features in the valve block a vent flow passage 316 joined to an over-pressure relief valve 318 and communicating with the interior volume 328 of the vessel, for relief of gross over-pressure conditions in the vessel.

The central fluid flow passage 320 in the valve head assembly 314 is joined at its lower end to a connector flow tube 330, which in turn is joined to the regulator 332. The regulator is set to maintain a selected pressure of the fluid discharged from the vessel.

At the lower end of the regulator is joined a tubular fitting 336. The tubular fitting 336 is joined, e.g., by butt welding, to a diffuser unit 334 having a diffuser end cap 331 at its lower extremity. The diffuser unit may be formed of stainless steel, with the diffuser wall being formed of a sintered stainless steel such as 316L stainless steel. The diffuser unit has a wall porosity that permits removal of all particles greater than a predetermined diameter, e.g., greater than 0.003 micrometers at 30 standard liters per minute flow rate of gas from the system. Filter diffuser units of such type are commercially available from Millipore Corporation (Bedford, Mass.) under the trademark WAFERGARD.

In use, a suitable fluid reagent is contained in the interior volume 328 of the vessel 302, e.g., a high pressure gas or a liquefied gas, or alternatively a sorbable gas sorptively retained on a physical sorbent having sorptive affinity for the gas, wherein the interior volume contains a bed of suitable solid-phase physical sorbent material.

The fluid pressure regulator 332 is set to a selected set point to provide flow of dispensed fluid when the valve in the valve head assembly 314 is opened, with the fluid flowing through the diffuser unit 334, fitting 336, regulator 332, connector flow tube 330, central fluid flow passage 320 in the valve head assembly 314, the central working volume cavity, and outlet 324.

The valve head assembly may be joined to other piping, conduits, flow controllers, monitoring means, etc. as may be desirable or required in a given end use application of the invention.

Mounted on the exterior surface of cylindrical side wall 304 is a pressure monitoring assembly 340 in accordance with the present invention. Such pressure monitoring assembly can be fabricated in any suitable manner, e.g., in a manner shown and described with reference to FIGS. 1 and 2, and operated to provide a dynamic monitoring of the pressure of the fluid in the vessel 302 during fluid storage and subsequent fluid dispensing operation.

Figure 3B:
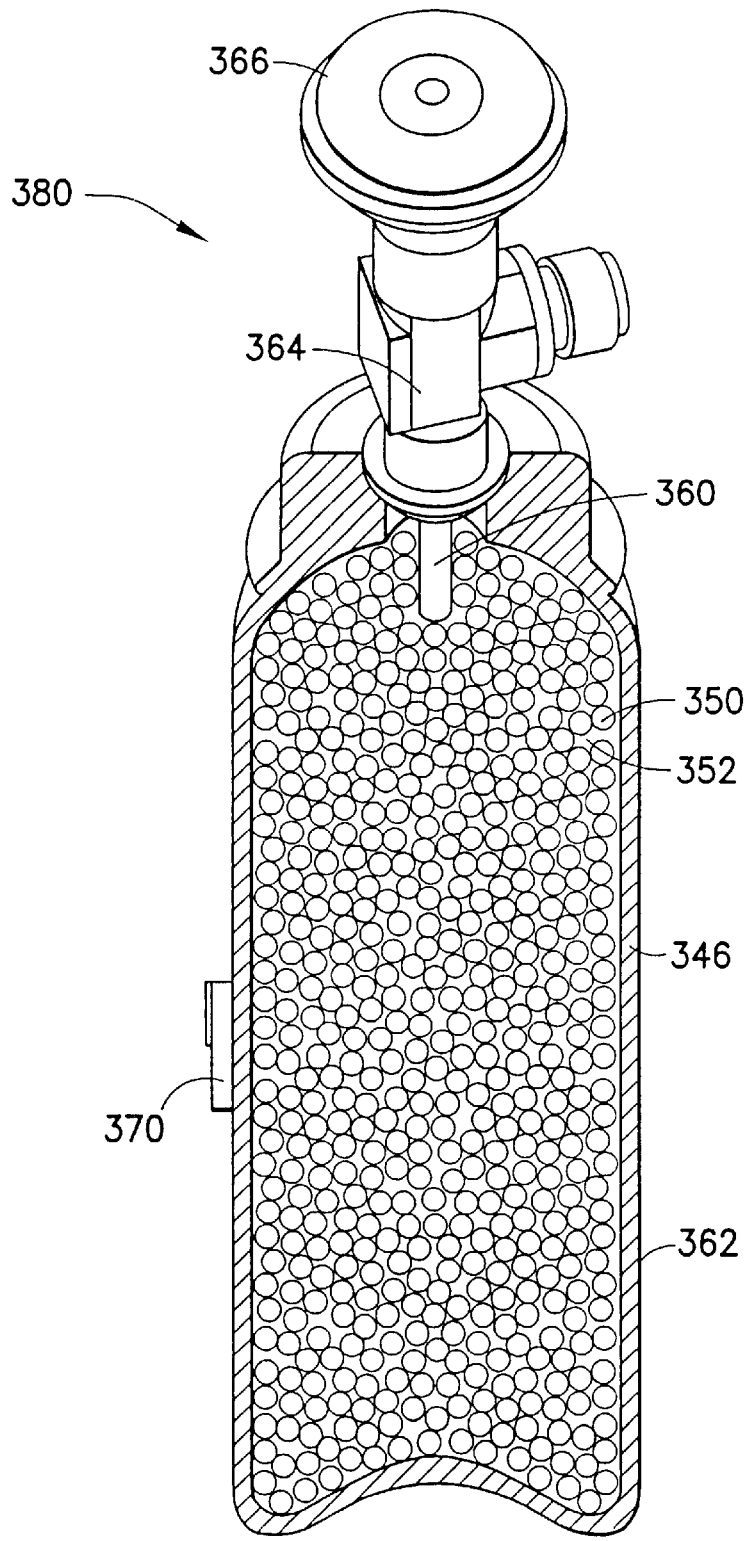
FIG. 3B is a schematic cross-sectional elevation view of a fluid storage and dispensing system according to yet another embodiment of the present invention, showing a physical adsorbent material disposed in the vessel.

FIG. 3B is a cross-sectional elevation view of a fluid storage and dispensing system 380 according to another embodiment of the present invention. The fluid vessel 362 comprises a wall 346 enclosing an interior volume 352 of the vessel, and containing a physical adsorbent material 350 therein. The upper end of the fluid vessel 362 is joined to a valve head 364 coupled with a manual valve actuator wheel 366 for opening and closing such valve head. A porous sintered tube 360, or other foraminous or otherwise gas-permeable structure serving to prevent entrainment in the dispensed fluid of particulate solids from the bed of the adsorbent material, may be advantageously provided.

A pressure monitoring assembly 370 is mounted on the exterior surface of the vessel wall 346. Generally, the internal pressure of such adsorbent-filled fluid vessel is at or below atmospheric pressure, from about 1 torr to about 1000 torr. Because the pressure monitoring assembly of the present invention is capable of measuring vessel internal pressure with a high level of accuracy, even when the internal pressure decreases to low levels, such pressure monitoring assembly is especially useful for improving pressure-monitoring accuracy in connection with the adsorbent-filled fluid vessel described hereinabove.

Figure 4A:
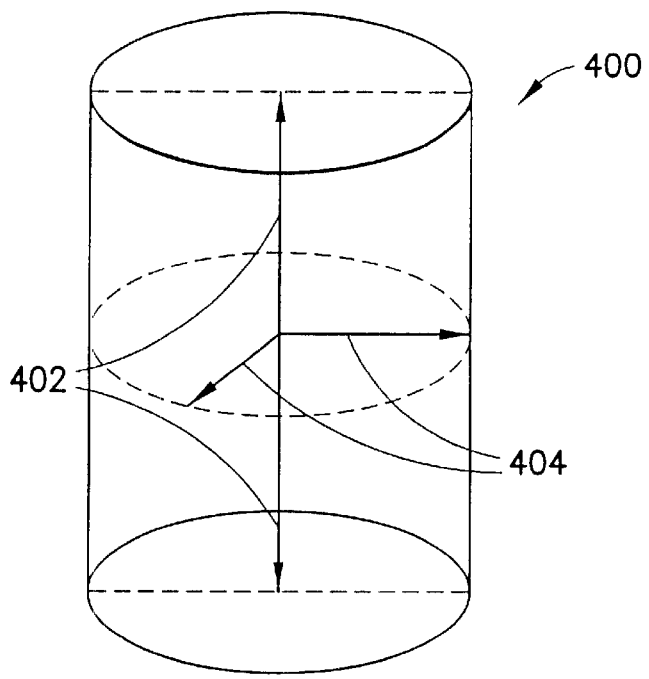
FIG. 4A is a schematic representation of a thin-walled cylinder with internal pressure stresses on the wall thereof.

FIG. 4A provides a schematic representation illustrating how the internal fluid pressure generates deformational forces on the side wall of a thin-walled cylindrical fluid vessel 400.

A "thin-walled cylindrical vessel" is defined herein as any vessel of cylindrical shape having a vessel wall thickness of less than one tenth of its cross-sectional radius.

The fluid vessel may for example be approximately cylindrical in shape, with a vessel wall thickness that is very small compared to the vessel's cross-sectional radius. Such vessel can be conveniently approximated by a thin-walled cylindrical fluid vessel in determining the quantitative relationship between internal pressure within the vessel and the resulting strain on its vessel wall induced by such pressure.

The internal pressure of fluid in the thin-walled cylinder 400 imposes deformational forces upon the wall of such cylinder in two directions: the longitudinal direction 402 and the circular (radial) direction 404.

Figure 4B:
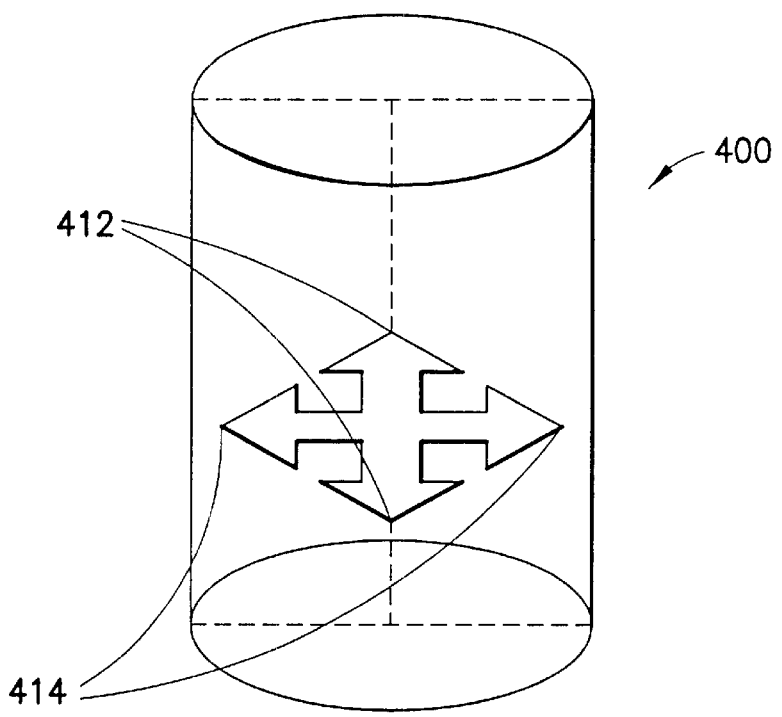
FIG. 4B is a schematic representation of resulting axial and radial strains on the side wall of the thin-walled cylinder of FIG. 4A due to stress imposed by the internal pressure.

FIG. 4B is a schematic illustration of resulting stress and strain generated on the thin-walled cylinder 400 by the above-mentioned deformational forces associated with the internal pressure in the vessel. The longitudinal and circular forces imposed by internal pressure cause stress on the cylinder wall of such cylinder 400 in two directions as well: axial stress in direction $412(_{ax})$ and radial stress in direction $414(_{rad})$.

The axial stress$_{ax}$ and radial stress$_{rad}$ of a thin-walled cylinder can be quantitatively determined for a given set of cylinder dimensions, material properties, and internal pressure, according to the following equations:

$$\sigma_{ax} = \frac{pr}{2t} \qquad \sigma_{rad} = \frac{pr}{t}$$

wherein p is the internal pressure, r is the average of the internal and external radius of the internal surface and external surface of such cylinder, respectively, and t is the thickness of the cylinder wall. There are thus two principal stress states in the cylinder, and this condition is known as a biaxial stress state.

The application of stress causes strain or deformation in an elastic material. In the cylinder under consideration, the axial stress$_{ax}$ will cause axial strain$(_{ax})$ on the cylinder wall, making the cylinder wall longer, and the radial stress$_{rad}$ will cause radial strain$(_{rad})$, increasing the diameter of such cylinder wall. According to Hook's law, the axial strain$(_{ax})$ and the radial strain$(_{rad})$ can be calculated knowing corresponding stresses, based on the following equation:

$$\varepsilon_{ax} = \frac{\sigma_{ax}}{E} - \frac{v\sigma_{rad}}{E} \qquad \varepsilon_{rad} = \frac{\sigma_{rad}}{E} - \frac{v\sigma_{ax}}{E}$$

wherein v is Possion's ratio characteristic of the cylinder wall material, which is equal to the ratio ([lateral strain that is perpendicular to applied stress caused by change of pressure]÷[longitudinal strain that is parallel to such applied stress]), and E is the modulus of elasticity characteristic of the cylinder wall material, equal to the ratio ([amount of stress applied to the vessel wall]÷[resulting strain in the vessel wall]). For a specific cylinder wall material, both v and E are known constants.

Using the above two sets of equations, the axial and radial stress on the wall of a cylinder can be readily expressed as linear functions of the internal pressure of such cylinder, as follows:

$$\varepsilon_{ax} = \frac{pr(1-2v)}{2tE} \qquad \varepsilon_{rad} = \frac{pr(2-v)}{2tE}$$

The present invention utilizes strain-responsive device(s) to quantitatively sense and/or measure the strain response on the wall of a vessel. The resultant data is employed to reversely compute the amount of internal pressure on the vessel wall. As discussed hereinabove, the strain response can be measured by any suitable device(s), including, without limitation, electrical resistance strain gauges, piezoelectric elements, strain-sensitive calorimeters, and strain-sensitive matrices containing a strain-responsive chemical reactant. Moreover, the instrumentality that is employed for measuring strain response can be pre-calibrated for the full pressure range applicable to the measured fluid vessel so that the read-out of such instrumentality directly indicates the internal pressure value.

One preferred embodiment of the present invention employs an electrical resistance strain gauge for measuring the strain response of the vessel wall. In this respect, it will be recognized that various of numerous other strain response measuring devices can be advantageously employed in the broad practice of the present invention.

One preferred electrical resistance strain gauge includes one or more strain-measuring grids that can be closely (e.g., contiguously) attached to the exterior wall of the fluid vessel. By attaching such strain-measuring grid to the exterior surface of the wall of the fluid vessel, in intimate contact therewith, the strain-measuring grid will experience the same degree of strain as does the vessel wall, i.e., the strain of such grid will equal the strain of the vessel wall of the fluid vessel.

The strain-measuring grid has an initial known electrical resistance $R_0$ (before the strain-measuring grid is attached to the exterior surface of the fluid vessel). When the strain-measuring grid is attached to the vessel wall, the strain( ) it experiences, which is essentially a change in its length (L) divided by its original length ($L_0$), will correspondingly cause proportional change in its electrical resistance (R). The relation between strain and resistance change of the device then is represented by the following equation:

$$\frac{\Delta R}{R_0} = K \times \frac{\Delta L}{L_0} = K \times \varepsilon$$

wherein K is the gauge factor characteristic of the strain-measuring grid.

When such strain-measuring grid is affixed to the exterior surface of the fluid vessel in a direction parallel to the direction of axial stress, the corresponding strain experienced by the device will be axial strain$_{ax}$, and the change of the resistance of the device will be proportional to $_{ax}$; if such strain-measuring grid is affixed to the surface of such vessel in a direction parallel to radial stress, the corresponding strain will be radial strain$_{rad}$, with a proportional resistance change as well; if such strain-measuring grid is affixed in any other directions, the strain it experiences will be a combination of axial strain and radial strain, such strain being readily determinable.

The resistance change of the strain-measuring grid is linearly correlated with the strain of the vessel wall to which the grid is attached, and the strain is indicative of the pressure of the fluid inside the vessel—therefore, the resistance change of such strain-measuring grid is also indicative of the pressure of the fluid in the vessel.

Figure 5:
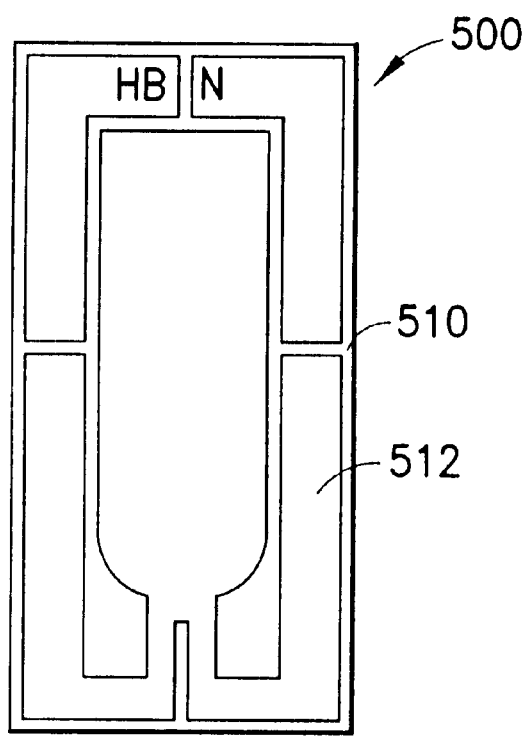
FIG. 5 is a front elevation view of a single strain-measuring grid according to one embodiment of the invention.

FIG. 5 is a front elevation view of an illustrative strain-measuring grid 500 that may be used in the practice of the present invention, commercially available in a HBM Type 1-LY11-6/350 Strain Gauge from Hottinger Baldwin Measurements, Inc. Marlboro, Mass.

The strain-measuring grid preferably comprises a conductive layer 510 and a base material layer 512. Such conductive layer and base material layer can comprise any suitable conductive material and base material, respectively, as will be apparent to those skilled in the art, who will on the basis of the disclosure herein be able to select desirable materials without undue experimentation according to specific requirements imposed by operational environments or conditions, e.g., the properties of fluid contained in the vessel, the properties of the vessel wall material, the operating temperature, the sensitivity of the resistance measuring device that is employed, etc.

Preferably, such conductive layer comprises a metal or metal alloy having an electrical resistance that undergoes only minor or insignificant change while the surrounding temperature fluctuates, thereby eliminating or minimizing potential bias in measurement by such strain-measuring grid due to fluctuation of temperature.

More preferably, such conductive layer is made of copper-nickel alloy, (e.g., Constantan alloy) containing copper in the range from 45% to 60% by weight and nickel in the range of 40% to 55% by weight, based on the total weight of the alloy.

The base material layer of such strain-measuring grid preferably comprises a material having suitable high temperature resistance and good elasticity properties so that its physical properties are not subject to significant change when the operational temperature varies abruptly, and so that the grid can stretch or shrink synchronously with the vessel wall it is attached to. In a preferred embodiment, such base material comprises polyimide.

The electrical resistance strain gauge assembly of the present invention also comprises means for measuring or monitoring the resistance change of such strain-measuring grid. Various conventional devices can be employed for measuring or monitoring such resistance change.

In a preferred embodiment of the present invention, the electrical resistance strain gauge assembly comprises a Wheatstone bridge circuit that incorporates the above-mentioned strain-measuring grid for measuring its resistance change with high sensitivity and accuracy.

Figure 6:
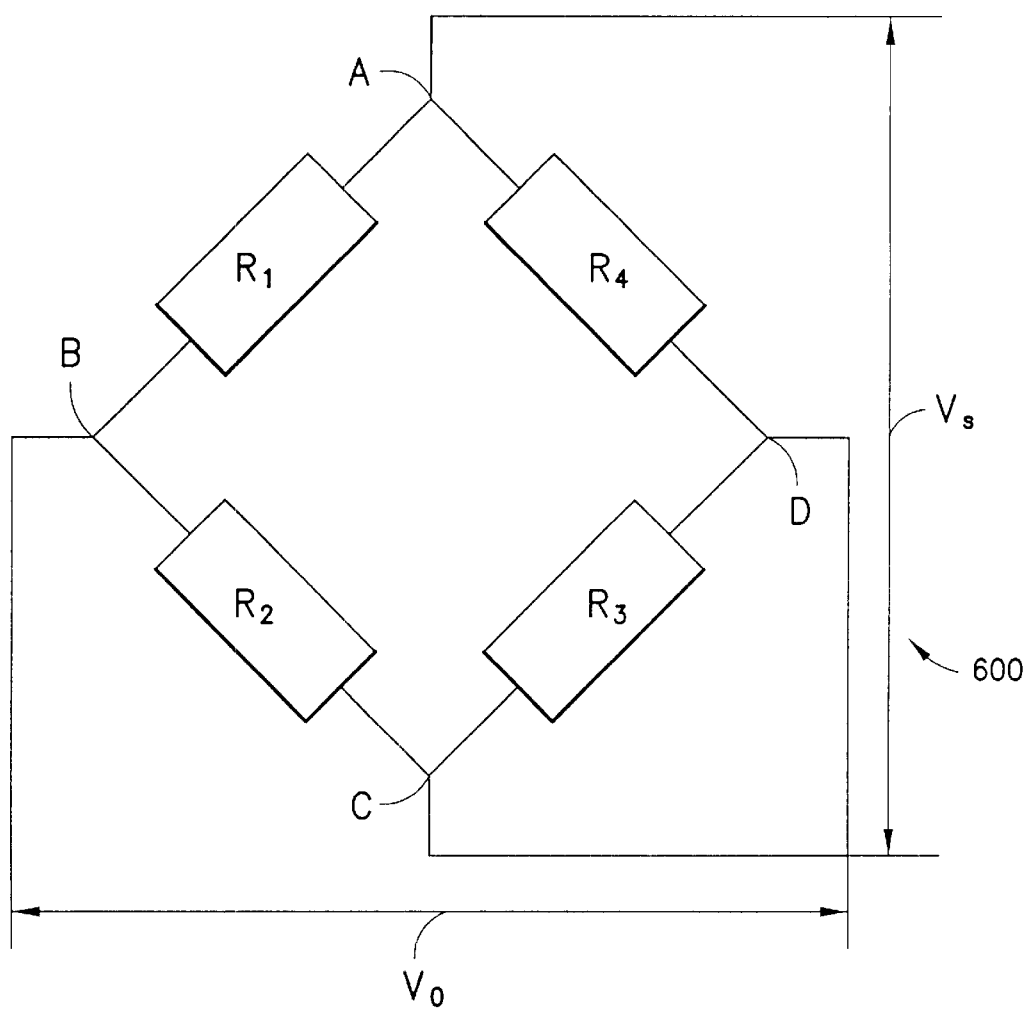
FIG. 6 is a schematic representation of a Wheatstone bridge circuit.

FIG. 6 is a schematic representation of a typical Wheatstone bridge circuit 600 including four resistors, $R_1$, $R_2$, $R_3$, and $R_4$. A known, constant voltage $V_S$ is applied at points A and C illustrated in FIG. 6. The initial resistances of resistors $R_1$, $R_2$, $R_3$, and $R_4$ are preset so that they bear a relation to one another as expressed by the following equation:

$$\frac{R'_1}{R'_2} = \frac{R'_4}{R'_3}$$

wherein $R_1$, $R_2$, $R_3$, $R_4$ are initial resistances of resistors $R_1$, $R_2$, $R_3$, $R_4$, respectively. In such configuration, the Wheatstone bridge circuit is balanced, since there is no electrical potential difference between points B and D, and therefore measured voltage $V_0$ at points B and D equals to zero. Whenever electrical resistance of one of the resistors $R_1$, $R_2$, $R_3$, and $R_4$ then changes, the balance of the Wheatstone bridge circuit is upset, i.e., the electrical potentials between points B and D are no longer equal, and the measured voltage $V_0$ at these two points will deviate from zero, with a deviation proportional to the changed resistance of that specific resistor.

Accordingly, one embodiment of the present invention utilizes a Wheatstone bridge circuit including three standard non-measuring resistors and a single strain-measuring grid whose resistance fluctuates with the strain it experiences. The fluctuation in electrical resistance of such strain-measuring grid is reflected by the change in the measured voltage $V_0$ and can be computed accordingly.

However, by using only one such strain-measuring gauge, the measurement obtained is potentially unstable and biased since the impact of temperature fluctuation on such measurement is ignored. Fluctuating temperature influences the measurement of the strain-measuring grid in two ways. First, increasing temperature causes both the wall of the fluid vessel to which the measuring grid is attached and the measuring grid itself to expand. This expansion is indicative of a change in the internal pressure in the vessel, but it should be reflected in the measurement by the measuring grid as a temperature bias. Secondly, although the fluid vessel wall and the strain-measuring grid both expand when temperature increases, the inevitable difference in their thermal expansion coefficients leads to different expansion rates of the grid and the vessel wall, which resultantly cause inaccurate measurement.

In order to compensate for potential temperature effects, another embodiment of the present invention employs a half bridge configuration, which incorporates two measuring grids. One measuring grid ("Grid A") is closely mounted to the fluid vessel to be measured and therefore is subject to both strain and temperature changes of the vessel wall. Another measuring grid ("Grid B"), which is placed adjacent to the active measuring Grid A, is subject to the same degree of temperature change of the vessel wall as Grid A, but Grid B is mounted to the fluid vessel loosely, e.g. at only one end, and is therefore not subject to strain change of the fluid vessel. As a result, the relative change of resistance of Grid A due to temperature fluctuation is compensated by Grid B's resistance change, but the portion of resistance change of Grid A caused by true strain is not affected by Grid B, and resulting measurement will then reflect only change due to true strain.

Another embodiment of the present invention employs a full bridge configuration of the Wheatstone bridge circuit. Such full bridge configuration incorporates four strain-measuring grids. Only one of the four strain-measuring grids ("Grid A") is mounted to the fluid vessel in a way to undergo synchronous deformation with the fluid vessel wall. The other three strain-measuring grids are disposed closely around Grid A so that they experience the same degree of temperature change as Grid A and therefore compensate for any temperature fluctuation. However, these three strain-measuring grids are loosely mounted to the fluid vessel and do not experience strain of the vessel wall. Therefore, the resulting measurement will be a "filtered" result reflecting only electrical resistance change due to true strain of the vessel wall.

Figure 7:
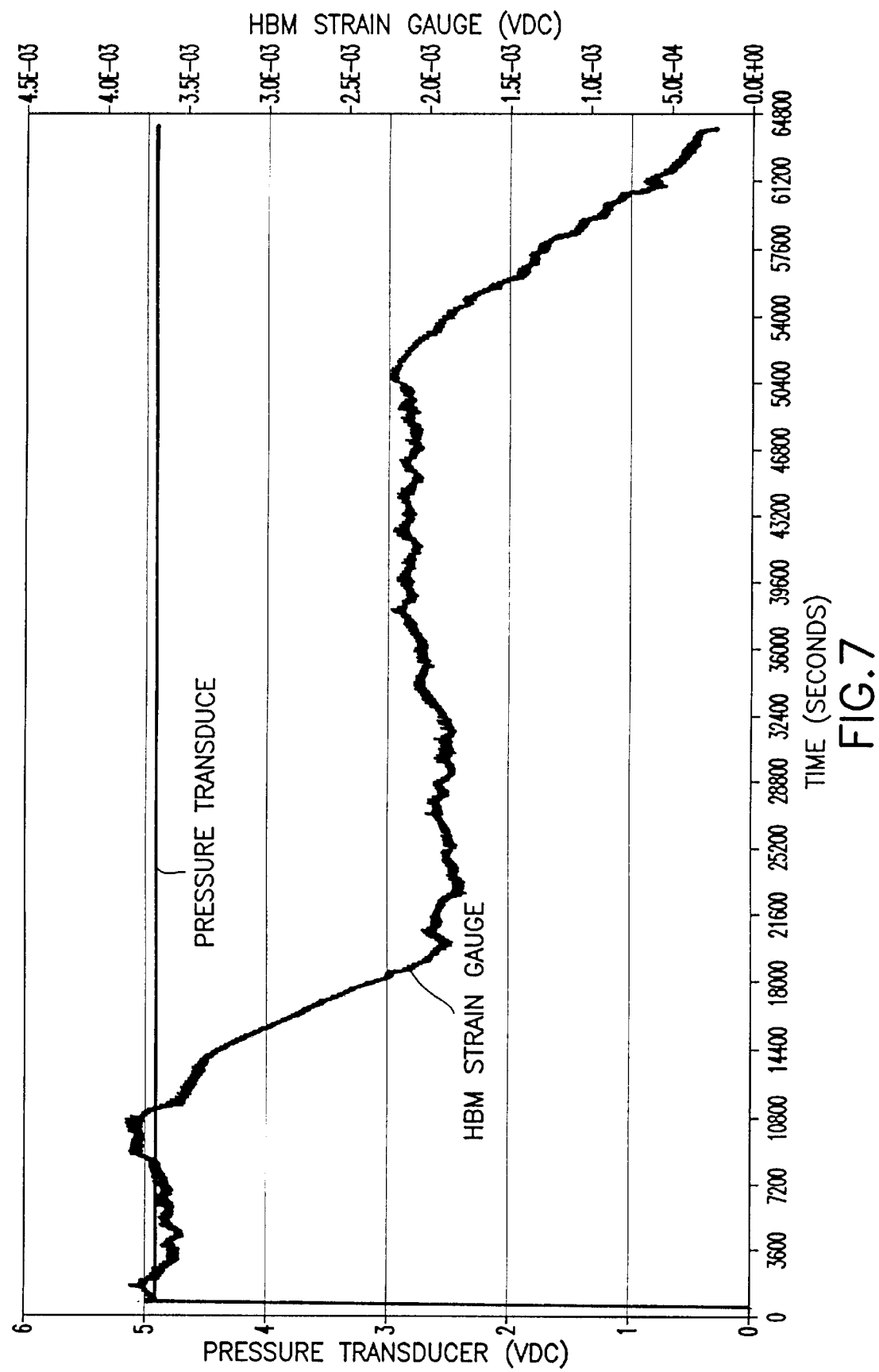
FIG. 7 is a graph of pressure transducer and strain gauge readings as a function of time, for a fluid-containing vessel equipped with a strain gauge comprising a single strain-measuring grid.

FIG. 7 is a graph of overnight pressure measurement by an HBM single gauge comprising a single strain-measuring grid, with the measured pressure being preset at approximately 100 psig. A pressure transducer is employed to indicate the actual internal pressure of the fluid vessel. Three standard non-measuring resistors are used with such strain-measuring grid to form a complete Wheatstone bridge circuit.

As shown by FIG. 7, strain measurement by such single strain-measuring grid demonstrates fluctuation during the initial three hours during which time the measurement is still approximate to the true value of strain. After three hours, the measurement diverges and is less correlative to the strain of the vessel wall of the fluid vessel.

Figure 8:
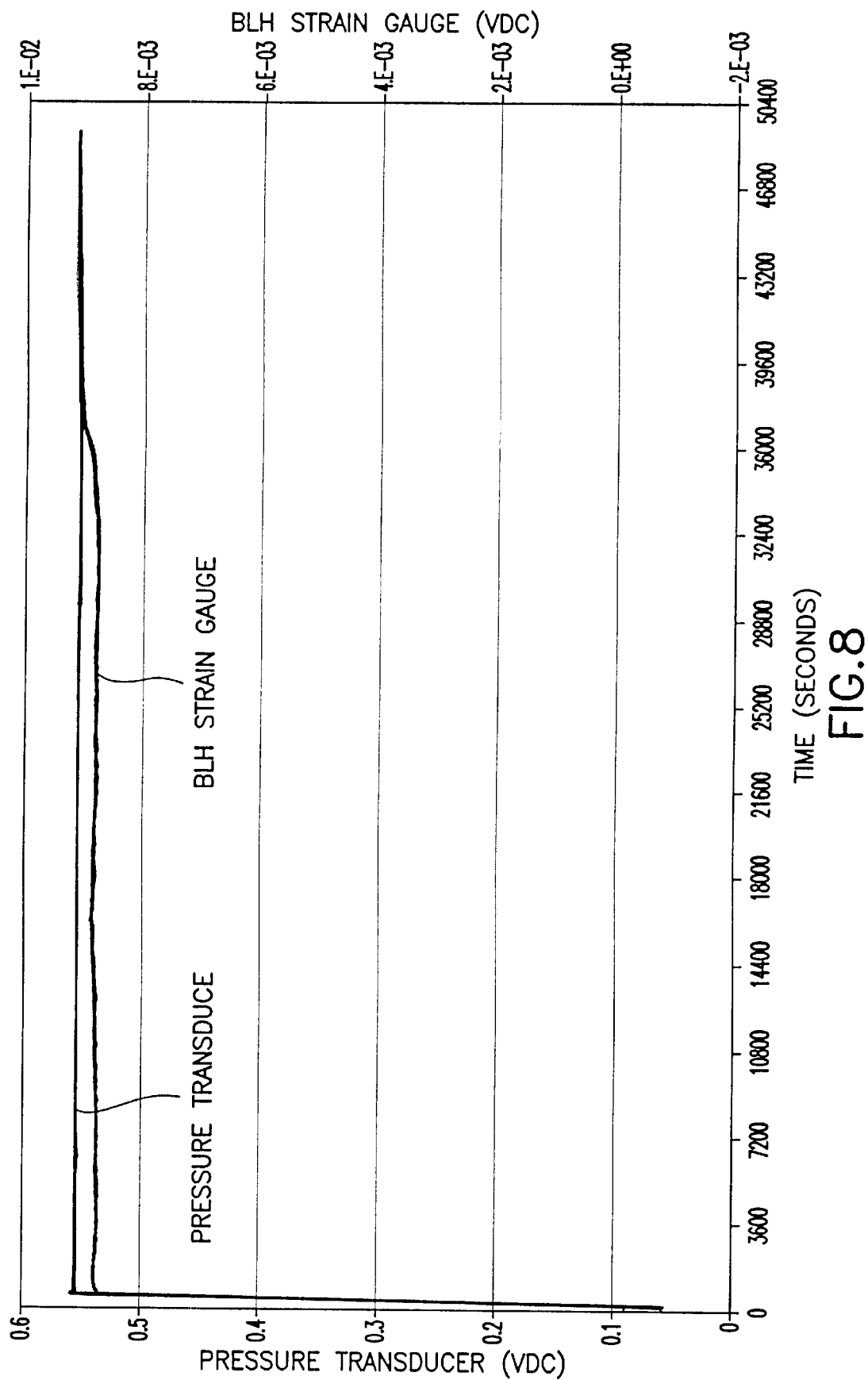
FIG. 8 is a graph of pressure transducer and strain gauge values as a function of time, for a fluid-containing vessel equipped with a full bridge strain gauge consisting of four strain-measuring grids.

FIG. 8 is a graph of overnight pressure measurement by a BLH strain gauge of a full bridge configuration, while the measured pressure is the same as that of FIG. 7. A pressure transducer is employed to indicate the actual internal pressure of the fluid vessel. The strain gauge of the full bridge configuration measures strain with substantially improved accuracy and stability, and the measurement by such strain gauge minimizes detrimental impacts of fluctuating temperature and accurately indicates the internal pressure of the fluid vessel to which it is exteriorly attached.

In instances where the thermal environment of the vessel being monitored is isothermal in character, the single strain-measuring grid strain gauge is advantageously used for pressure monitoring of the vessel. If the vessel is in an ambient environment characterized by fluctuations in temperature, the half or full bridge strain gauge is desirably employed.

The electrical resistance strain gauge assembly, or a pressure monitor including such assembly, can be attached onto the exterior surface of the fluid vessel at any suitable location. Preferably a location is chosen that enables easy attachment of the strain gauge to the vessel. In one embodiment, the vessel wall is fabricated to be comparatively thinner at the region of attachment of the strain gauge. Since the stress and strain characteristics of the vessel wall are negatively correlated with the thickness of the vessel wall at a given internal pressure, attaching the strain gauge at a location where the vessel wall is thinner than elsewhere will produce a comparatively stronger (strain change) output when the internal pressure changes.

With reference to FIG. 3, the vessel wall of the fluid vessel 302 can be specified as including three parts: the cylindrical side wall 304 (hereinafter "side wall"), the floor member 306 (hereinafter "bottom"), and the neck 308 at the upper end of the vessel (hereinafter "top"). The thickness of the vessel wall at the side wall of a typical gas cylinder is characteristically thinner than the vessel wall at the bottom or at the top, and the side wall has a comparatively flatter surface for attachment of the strain gauge. Therefore, the strain gauge is advantageously mounted on the side wall of the fluid vessel.

Figure 9:
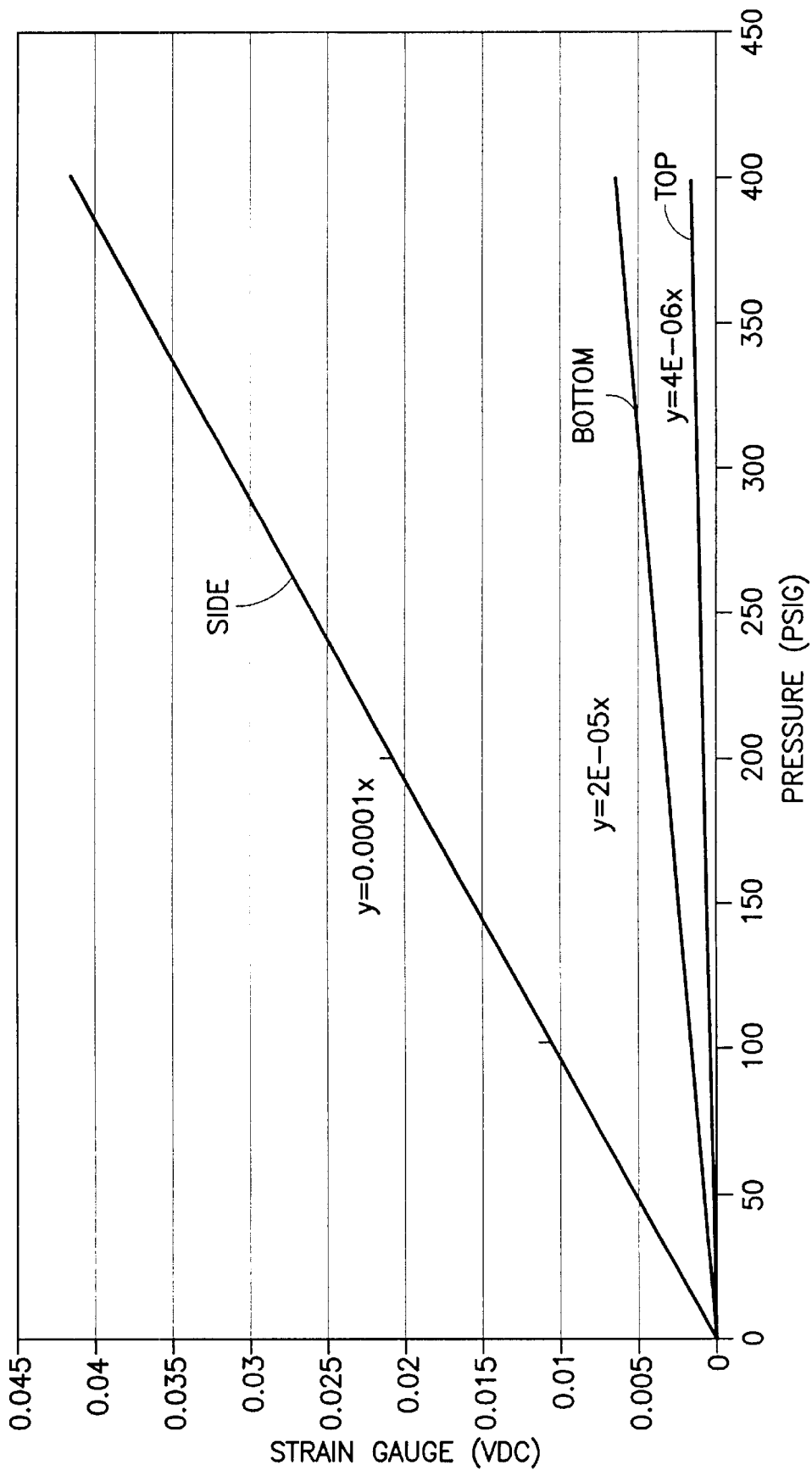
FIG. 9 shows comparative plots of strain measured as a function of internal vessel pressure (in psig), based on measurements by three strain-responsive sensors disposed on the exterior surface of a fluid vessel at three different locations (i.e., respectively at the side wall, bottom, and top of such fluid vessel).

FIG. 9 is a graph of strain response measured as a function of internal pressure of the vessel (in psig), based on strain measurements obtained by three separate strain-responsive sensors exteriorly disposed on the side wall of the fluid vessel, the bottom of the vessel, and the top of the vessel, respectively. For the same amount of internal pressure change, the strain-responsive sensor disposed on the side wall of the vessel experiences a larger strain change and therefore outputs a stronger pressure-indicative signal.

The strain gauge may be directly attached to exterior surface of the fluid vessel. Because the strain-measuring grid has to experience strain synchronously with the vessel wall, proper alignment and homogeneous contact between the strain-measuring grid and the vessel wall of the fluid vessel is essential for accurate measurement of strain and internal pressure.

The exterior surface of the vessel can be initially treated by any of various methods to establish a proper attachment region for the strain-gauge grid. For example, a metal file may be employed to remove any paint, bumps, pits or corrosion that may be present on such exterior surface. After the exterior surface has thus been processed to achieve a relatively homogeneous consistency at the region of attachment for the strain gauge, fine sandpaper or a Scotch-Bright® pad may be used for polishing it and removing any scratches left by the metal file, to form a mirror like surface. Such surface can be further rinsed with cleaning solvents for cleaning of any remaining oil, dirt, or metal filings.

For properly aligning the strain-measuring grid to the prepared exterior surface of the fluid vessel, a reference line can be scribed onto such surface of the vessel, and a piece of tape may be applied to the grid to put the grid loosely in its place and to allow further adjustment of the alignment. A strain gauge adhesive may be applied on a side of such grid that directly contacts the exterior surface of the vessel, to thereby effect secure attachment of the strain-measuring grid to the surface of the vessel. Such strain gauge adhesive may a common air-curing adhesive. Generally, complete curing of the adhesive material can be effected by heating to an elevated temperature at about 350° F. for a period of about three hours.

Such heating requirement, however, imposes processing difficulties because vessel handling in this instance is cumbersome and logistically difficult. The delicate parts of the fluid vessel, such as the valve heads and the regulator assembly, cannot go through such heating process, which will cause substantial damage to those parts. Therefore, the strain gauge should be installed and curing of the adhesive should be conducted before the fluid vessel is assembled. Moreover, if a strain gauge fails, replacement has to be carried out after the fluid vessel is disassembled and the delicate parts removed. Disassembling a fluid vessel is not only time-consuming, but also increases the susceptibility of the system to failure due to galled threads on the valve and the vessel after disassembling.

Therefore, as an alternative to permanently adhesively binding the strain gauge to the vessel wall, a removable clamp may be employed to removably clamp such strain gauge onto the vessel wall. This eliminates the necessity of disassembling the fluid vessel for replacing a strain gauge.

Moreover, the strain gauge can be indirectly attached to the fluid vessel. Specifically, the strain gauge may be closely and permanently mounted to an elastic band member by adhesive, with such band member removably fitted around the circumference of the fluid vessel. When the fluid vessel is stressed or deformed due to changes in internal fluid pressure, such elastic band member will stretch or deform proportionally. The strain gauge mounted on such elastic band member will responsively undergo strain change proportional to strain experienced by the fluid vessel wall. Therefore, the strain gauge can still measure the fluid vessel strain through corresponding deflection of the elastic band member.

The elastic band member may be formed of any suitable materials of construction, e.g., a metal or metal alloy, or alternatively a polymeric material.

Figure 11:
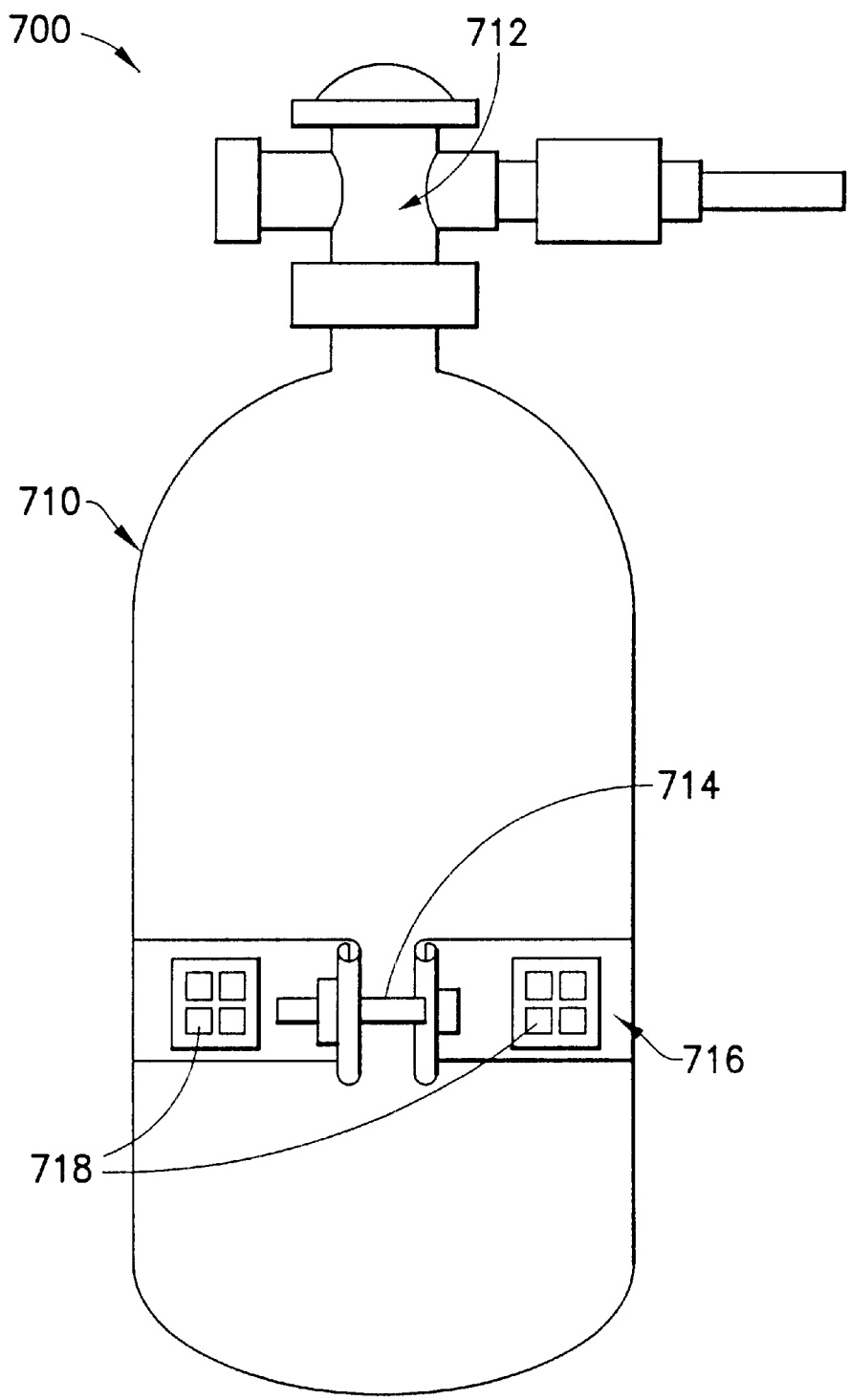
FIG. 11 is an elevation view of a fluid storage and dispensing apparatus having one annular band circumferentially fitted around it, to which two electrical resistance strain gauge devices are closely attached, according to one embodiment of the present invention.

The strain sensing assembly may comprise an annular ring circumferentially fitted around the exterior surface of the fluid vessel, as shown by FIG. 11. The fluid vessel 700 comprises a cylindrical vessel body 710 and a valve head 712. An elastic polymeric ring 716 is closely fitted around vessel body 710 through adjustment of adjustment screw 714. Strain gauges 718 are permanently mounted on the polymeric ring 716. When the cylindrical vessel body 710 expands due to increased internal fluid pressure, the elastic polymeric ring 716 will also expand by the same or proportional amount in the radial direction, which is subsequently measured by strain gauges 718 as an indication of radial strain experienced by the fluid vessel wall due to internal pressure change.

Figure 12:
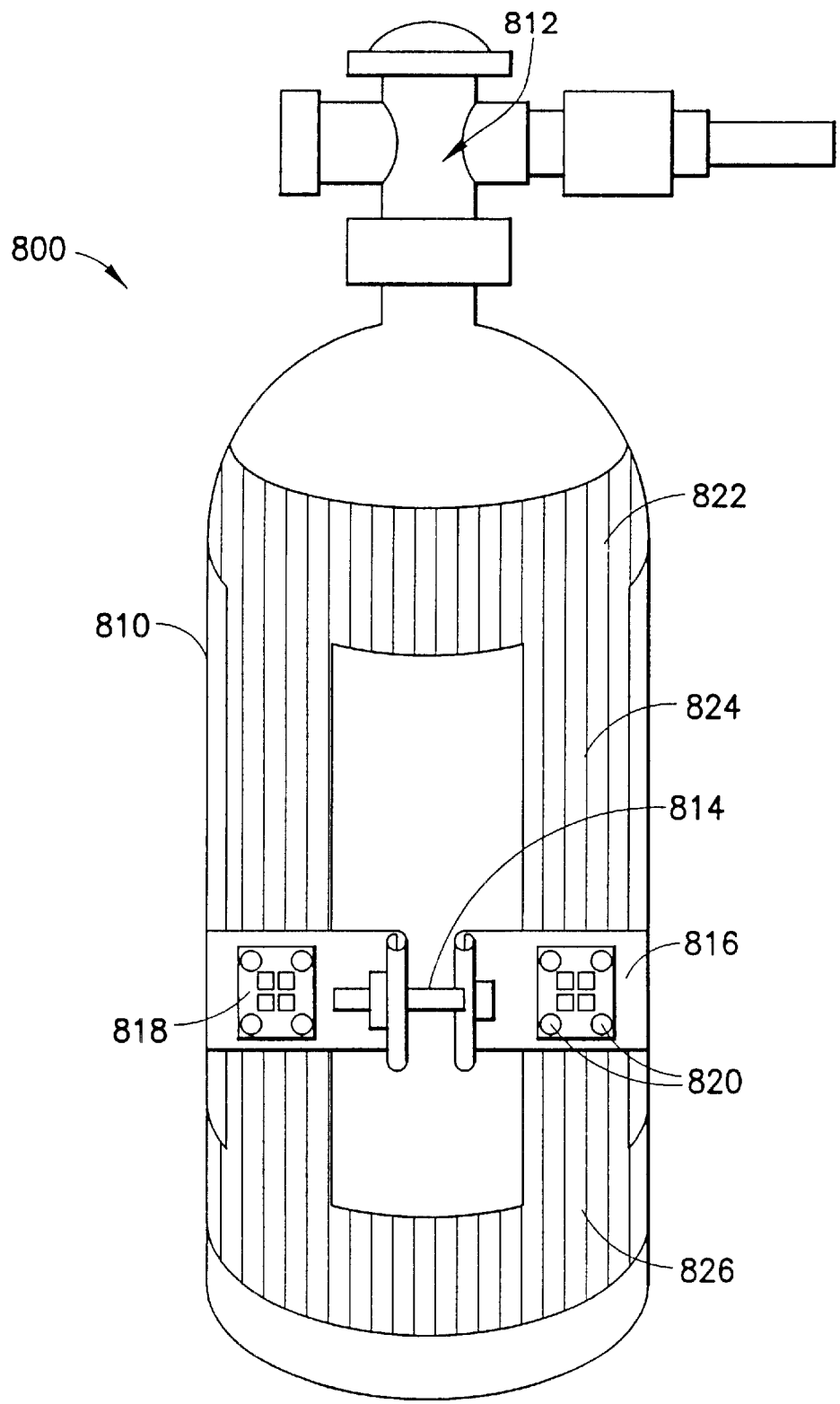
FIG. 12 is an elevation view of a fluid storage and dispensing apparatus having a harness-type band member fitted on its exterior surface, such harness-type band member comprising annular rings and elongated strip components, according to another embodiment of the present invention.

The elastic band member may also comprise both annular rings and elongated strips to form a harness-type structure, as shown by FIG. 12. Fluid vessel 800 comprises a cylindrical vessel body 810 and a valve head 812. The elastic band member comprises elongated strips 824, top annular ring 822, middle annular ring 816, and bottom annular ring 826. The annular rings and the elongated strips intersect with each other, and at their intersection, both the radial strain and axial strain experienced by the fluid vessel are reflected in the elastic band. Therefore, strain gauges 818 are mounted on the elastic band member at two intersections by mechanical fasteners 820 so that strain gauges 818 can measure both the radial and axial strains experienced by the fluid vessel 800. When any of the multiple strain gauges needs replacement, the middle annular ring 816 can be easily removed from the fluid vessel body 810 by loosing adjustment screw 814.

The pressure monitor including the strain gauge may comprise means for converting relative changes of electrical resistance measured by its sensor module into a direct representation of internal pressure of the fluid vessel. For example, if the electrical resistance strain gauge sensor module is initially calibrated for a "full" vessel condition and associated pressure, then the change in resistance can be converted to an output signal by suitable signal processing in the logic unit (of the integrated circuitry) in the display module of the pressure monitoring assembly. This arrangement provides an output directly representing the value of internal pressure.

The strain-responsive sensor of the present invention affords an economic, efficient and readily implemented solution to the problem of monitoring fluid pressure in a closed vessel during discharge of fluid therefrom.

The electrical resistance strain gauge assembly disclosed herein is capable of measuring a very broad range of vessel internal pressures, from sub-atmospheric pressure of about several psi to pressure as high as several thousands psi that is typical for conventional high pressure gas cylinder.

Moreover, the electric resistance strain gauge assembly has a high level of measuring accuracy (e.g., ±1 psi), even when the internal pressure decreases to low levels (e.g., 50 psig) where conventional pressure-measuring devices become progressively more susceptible to error.

The strain gauge arrangement of the present invention is useful in application to a fluid storage and dispensing vessel of the type having a "regulator in a bottle" arrangement, e.g., as described in the aforementioned U.S. Pat. No. 6,089,027 and U.S. Pat. No. 6,101,816, where direct internal measurement of the vessel pressure is impractical.

Alternatively, the invention is also useful for the sorbent-based fluid storage and dispensing system disclosed in U.S.

Pat. No. 5,518,528. It is also useful for conventional high-pressure fluid cylinders, and the specific embodiments and features described hereinabove shall not be construed as limitations against broad applicability of the present invention.

The strain gauge monitoring system of the invention can also be used to measure pressure and pressure drop of other semiconductor process units such as particle filters, purifiers and dry scrubbers. This deployment of the strain gauge monitoring system eliminates the need for other mechanical or electronic pressure-monitoring devices that may increase contamination susceptibility, overall facility size and purge requirements. Use of the ex-situ strain gauge monitoring system in these applications reduces cost and complexity of the overall arrangement of process equipment.

The invention thus provides a convenient means of determining internal pressure of sealed vessels containing fluid at pressure that is variable depending on the ambient conditions, rate of dispensing of fluid from the vessel, decomposition of the contained fluid, reaction of the contained fluid with the confining surfaces of the vessel, outgassing of the walls of the vessel, etc. The vessel is thus non-invasively monitored for pressure of the fluid in the interior volume of the vessel during its storage, transport, and use, in a simple, economic and efficient manner.

The features and advantages of the invention are more fully understood with reference to the following non-limiting example.

EXAMPLE

The behavior of an electrical resistance strain gauge assembly arranged to monitor the internal pressure of a fluid-containing vessel was evaluated over an internal pressure range from 0 to 1000 psig to determine the strain gauge response over such pressure range. The fluid vessel was a JY SDS® gas cylinder (Advanced Technology Materials, Inc., Danbury, Conn.), and the fluid was helium gas from a high-pressure gas cylinder.

The high-pressure helium cylinder and the JY SDS® gas cylinder were connected by a communication conduit containing a pressure regulator for controlling the pressure of the helium gas outflow from the high-pressure cylinder to the JY SDS® cylinder. A pressure transducer was coupled to the JY SDS® gas cylinder for measuring the actual pressure of the gas inside such cylinder to provide reference data in determining the accuracy of pressure output generated by the strain gauge assembly.

The electrical resistance strain gauge assembly used in this example included a BLH Type FAE4-A6257J-120-S6EL strain gauge, having a full bridge configuration with four active strain-measuring grids. Output data generated by such strain gauge was transmitted to a HBM Digital Strain Meter for read-out of the strain value measured by the strain gauge. The strain meter was pre-calibrated for a full vessel condition and associated pressure so that the strain value could be amplified to directly represent the internal pressure of the JY SDS® gas cylinder.

The internal gas pressure of the JY SDS® gas cylinder was cyclically changed from atmospheric pressure (set at 0 psig) to 1000 psig in sequential increments of 100 psi and then back to atmospheric pressure in sequential decrements of 100 psi.

Figure 10:
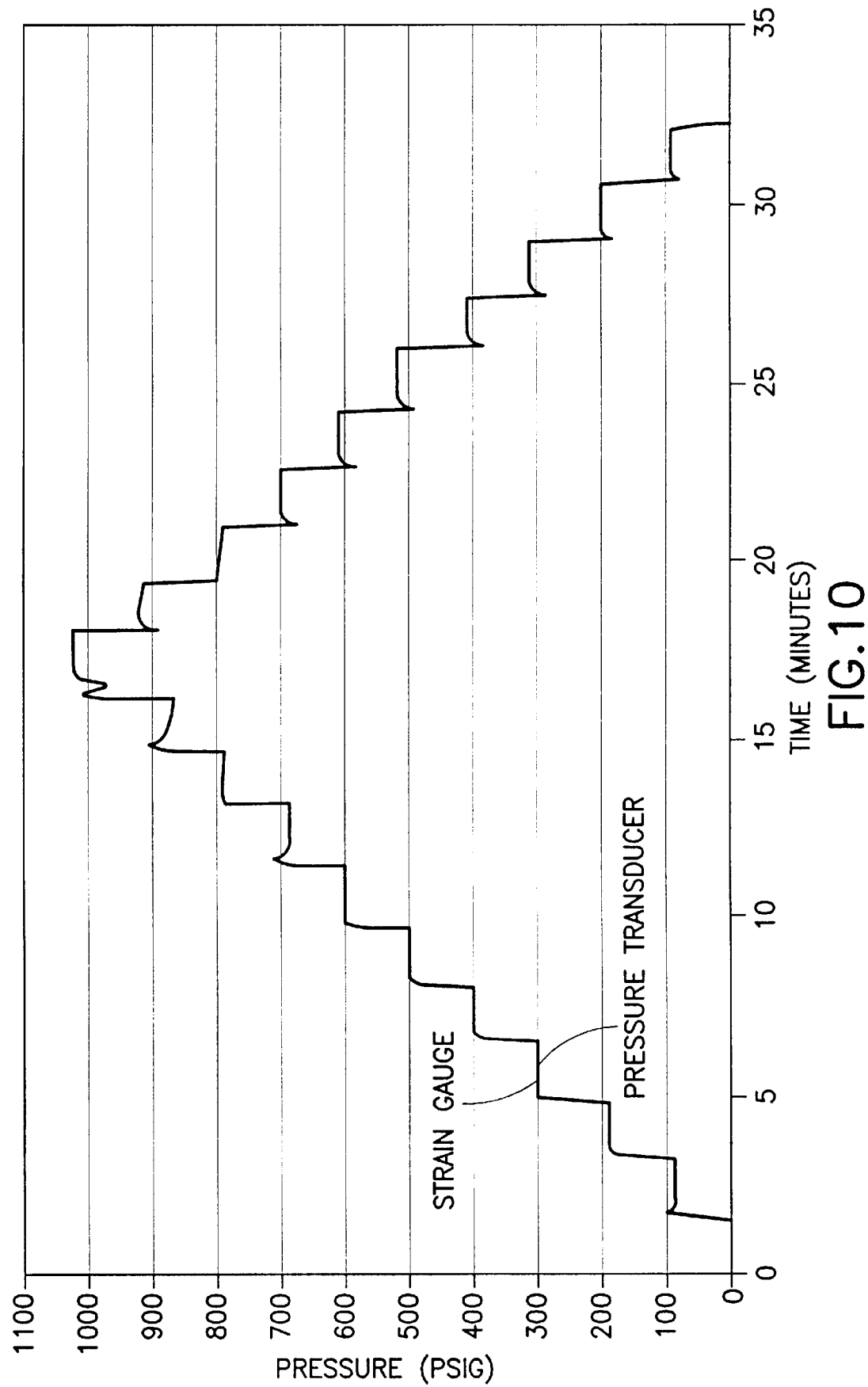
FIG. 10 is a graph of cyclic measurement of internal vessel pressure by a strain-responsive sensor, in which the internal vessel pressure increases from atmospheric pressure (set at 0 psig) to 1000 psig by successive increments of 100 psi and then falls back to atmospheric pressure by successive decrements of 100 psi.

FIG. 10 is a graph of the pressure measurement data collected from the electrical resistance strain gauge, and the base measurement data collected from the pressure transducer. The line representing the strain gauge data and the line representing the pressure transducer data approximately overlap, thereby indicating that the strain gauge measurement accurately tracked the actual internal pressure during the stepwise increase and subsequent stepwise decrease of pressure.

While the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art, within the scope of the appended claims.

What is claimed is:

1. A fluid containment system, comprising:
    a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;
    said vessel including a vessel wall with an interior surface in contact with the fluid contained in the vessel, and an exterior surface; and
    a pressure monitor including a strain-responsive sensor disposed on the exterior surface of said vessel, for generating a pressure-indicative response correlative of pressure of fluid in the vessel, whereby pressure can be monitored as fluid is discharged from the vessel and pressure of the fluid in the vessel correspondingly changes with such discharge.

2. The system of claim 1, wherein the pressure-indicative response is related to strain in the vessel wall caused by the pressure of the fluid in the vessel, according to the following equations:

$$\varepsilon_{ax} = \frac{pr(1-2v)}{2tE} \qquad \varepsilon_{rad} = \frac{pr(2-v)}{2tE}$$

wherein:
    $\epsilon_{ax}$=strain in an axial direction in the vessel wall;
    $\epsilon_{rad}$=strain in a radial direction in the vessel wall;
    p=internal pressure of fluid in the vessel;
    r=average of the internal and external radius of the vessel wall;
    v=Poisson's ratio of the vessel wall, which equals the ratio of (lateral strain that is perpendicular to applied stress caused by change of pressure)÷(longitudinal strain that is parallel to such applied stress);
    t=thickness of the vessel wall; and
    E=modulus of elasticity of the vessel wall, which equals the ratio of the applied stress to the resulting strain in the vessel wall.

3. The system of claim 1, wherein the strain-responsive sensor comprises a component selected from the group consisting of electrical resistance strain gauges, piezoelectric elements, strain-sensitive colorimetric elements, and strain-sensitive matrices containing a strain-activated chemical reactant.

4. The system of claim 1, wherein the strain-responsive sensor comprises an electrical resistance strain gauge assembly.

5. The system of claim 4, wherein the electrical resistance strain gauge assembly comprises one or more strain-measuring grids.

6. The system of claim 5, wherein each of said one or more strain-measuring grids comprises a layer of conductive material.

7. The system of claim 6, wherein electrical resistance of said conductive material is substantially independent of fluctuation of surrounding temperature.

8. The system of claim 6, wherein each of said one or more strain-measuring grids further comprises a layer of base material underneath said layer of conductive material.

9. The system of claim 5, wherein the electrical resistance strain gauge assembly comprises a Wheatstone bridge circuit for measuring resistance change of said one or more strain-measuring grids.

10. The system of claim 9, wherein said Wheatstone bridge circuit comprises one said strain-measuring grid.

11. The system of claim 9, wherein said Wheatstone bridge circuit comprises two said strain-measuring grids.

12. The system of claim 9, wherein said Wheatstone bridge comprises four said strain-measuring grids.

13. The system of claim 1, wherein the pressure monitor further comprises means for converting the pressure-indicative response of said strain-responsive sensor into a quantitated value for pressure of fluid in the vessel.

14. The system of claim 1, wherein the pressure monitor comprises a visual output display.

15. The system of claim 1, wherein the pressure monitor comprises a power supply.

16. The system of claim 1, wherein the vessel is vertically upstanding and the pressure monitor is disposed on the exterior surface of the vessel on a side wall thereof.

17. The system of claim 1, wherein the pressure monitor is mounted to the exterior surface of the vessel by a mounting means.

18. The system of claim 17, wherein said mounting means comprises a removable clamp.

19. The system of claim 1, wherein the pressure monitor is mounted on a band member, and the band member is removably secured to the exterior surface of the vessel.

20. The system of claim 19, wherein said band member comprises an elastic material selected from the group consisting of metals and polymers.

21. The system of claim 19, wherein said band member comprises an annular ring circumferentially extended around the exterior surface of the vessel.

22. The system of claim 19, wherein said band member comprises an elongated strip longitudinally mounted to the exterior surface of the vessel.

23. The system of claim 19, wherein said band member comprises:
one or more annular rings circumferentially extended around the exterior surface of the vessel; and
one or more elongated strips longitudinally mounted to the exterior surface of the vessel,
wherein said annular rings and elongated strips intersect each other at one or more intersecting locations, and wherein the pressure monitor is mounted on the band member at said one or more intersecting locations.

24. The system of claim 1, further comprising a valve head assembly mounted on the vessel and leak-tightly sealed thereto.

25. The system of claim 24, wherein the valve head assembly comprises a discharge port.

26. The system of claim 25, wherein the valve head assembly further comprises a fill port.

27. The system of claim 24, wherein the vessel contains a regulator assembly mounted therein such that fluid discharged from the vessel flows through the regulator assembly, at a pressure determined by a pressure set point of the regulator assembly, prior to flow of the fluid through the valve head assembly.

28. The system of claim 1, wherein the vessel wall is formed of a material selected from the group consisting of metals, gas-impermeable plastics, fiber-resin composite materials, and combinations comprising two or more of the foregoing.

29. The system of claim 1, joined in fluid flow feed relationship with a fluid-consuming process unit.

30. The system of claim 29, wherein the fluid-consuming process unit comprises a semiconductor manufacturing facility.

31. The system of claim 1, further comprising a valve head assembly mounted on the vessel and leak-tightly sealed thereto, wherein the valve head assembly comprises a valve head body containing a flow control valve therein, and means for opening or closing said flow control valve.

32. The system of claim 31, wherein said means for opening or closing said flow control valve, comprise an element selected from the group consisting of hand wheel valve actuation elements, pneumatic valve actuators, and electromechanical valve actuators.

33. The system of claim 1, wherein the vessel contains a fluid.

34. The system of claim 33, wherein the fluid comprises a liquid.

35. The system of claim 33, wherein the fluid comprises a liquefied gas.

36. The system of claim 33, wherein the fluid comprises a compressed gas.

37. The system of claim 33, wherein the fluid comprises a hydride fluid.

38. The system of claim 37, wherein the hydride fluid comprises a fluid selected from the group consisting of arsine, phosphine, stibine, silane, halogenated silanes and diborane.

39. The system of claim 33, wherein the fluid comprises an acid gas selected from the group consisting of hydrogen fluoride, boron trichloride, boron trifluoride, hydrogen chloride, halogenated silanes and halogenated disilanes.

40. The system of claim 1, wherein the vessel contains a physical adsorbent material having sorptive affinity for said fluid.

41. The system of claim 40, wherein said physical adsorbent material is capable of selectively dispensing said gases by pressure differential desorption.

42. The system of claim 40, wherein said physical adsorbent material stores said fluid at an internal pressure within the range from about 1 torr to about 1000 torr.

43. A fluid containment system, comprising:
a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;
said vessel including a vessel wall with an interior surface in contact with the fluid contained in the vessel, and an exterior surface; and
a pressure monitor including a strain-responsive sensor disposed on the exterior surface of said vessel, for generating a pressure-indicative response correlative of pressure of fluid in the vessel, whereby pressure can be monitored as fluid is discharged from the vessel and pressure of the fluid in the vessel correspondingly changes with such discharge, wherein said strain-responsive sensor comprises an electrical resistance stain gauge assembly comprising one or more strain-gauge grids, wherein each of said one or more strain-measuring grids comprises a layer of conductive material, and wherein said conductive material comprises metal or metal alloy.

44. The system of claim 43, wherein said conductive material comprises a copper-nickel alloy including 45%–60% copper and 40%–55% nickel by weight, based on total weight of the alloy.

45. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the strain-responsive sensor comprises an electrical resistance strain gauge assembly that comprises one or more strain-measuring grids, and wherein each of said one or more strain-measuring grids comprises a layer of conductive material and a layer of base material underneath said layer of conductive material, and wherein the base material is temperature-resistant and elastic.

46. The system of claim 45, wherein the base material comprises polyimide.

47. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the pressure monitor comprises an audible output display.

48. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the pressure monitor is constructed and arranged for continuous monitoring of pressure.

49. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the pressure monitor is constructed and arranged for intermittent monitoring of pressure.

50. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the pressure monitor is constructed and arranged for remote outputting of pressure monitoring data.

51. The system of claim 50, wherein the pressure monitor is connected to a radio-frequency transponder.

52. The system of claim 51, wherein the radio-frequency transponder comprises:

at least one transmitter attached to the pressure monitor of the vessel for translating the pressure-indicative response outputted by the strain-responsive sensor into radio-frequency signals; and at least one receiver for remotely receiving the radio-frequency signals transmitted by the transmitter.

53. The system of claim 52, wherein the radio-frequency transponder further comprises at least one microprocessor for interpreting the radio-frequency signals received by the receiver.

54. The system of claim 53, wherein the radio-frequency transponder further comprises a displaying means connected to said microprocessor for displaying the pressure-indicative response transmitted by said radio-frequency transponder.

55. The system of claim 54, wherein the displaying means is selected from the group consisting of a visual display and an audible display.

56. The system of claim 52, wherein the radio-frequency transponder system comprises multiple transmitters.

57. The system of claim 53, wherein the radio-frequency transponder system is connected to a computerized information system.

58. The system of claim 57, wherein said computerized information system comprises a computer network with multiple terminals, and wherein each terminal receives data inputs from at least one radio-frequency transponder system.

59. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the pressure monitor is disposed on the exterior surface of the vessel at a location where the vessel has a lowest wall thickness.

60. The system of claim 59, wherein the vessel has a side wall and the lowest wall thickness location is on said side wall.

61. A fluid containment system, comprising:

a closed, sealed vessel adapted to be removably coupled with a fluid-using process unit, said vessel being constructed and arranged to retain a fluid therein, with means joined to the vessel for selectively dispensing fluid from the vessel to the process unit for use in said unit, with said vessel being adapted for uncoupling from the process unit and change-out of the vessel when fluid in the vessel is exhausted;

said vessel including a vessel wall with an interior surface in contact with the fluid contained in the vessel, and an exterior surface; and a pressure monitor including a strain-responsive sensor disposed on the exterior surface of said vessel, for generating a pressure-indicative response correlative of pressure of fluid in the vessel, wherein pressure can be monitored as fluid is discharged from the vessel and pressure of the fluid in the vessel correspondingly changes with such discharge, wherein the pressure monitor is mounted to the exterior surface of the vessel by an adhesive material.

62. A fluid storage and dispensing apparatus, comprising:

a closed, sealed fluid storage and dispensing vessel enclosing an interior volume for holding a fluid, wherein the vessel includes a fluid discharge port for discharging fluid from the vessel;

a pressure regulating element in the interior volume of the fluid storage and dispensing vessel, arranged to flow fluid therethrough to the fluid discharge port at a set pressure for dispensing thereof; and a pressure monitor including a strain-responsive sensor disposed on an exterior surface of said vessel, for generating a pressure-indicative response correlative of pressure of fluid in the vessel, whereby pressure can be monitored as fluid is discharged from the vessel and pressure of the fluid in the vessel correspondingly changes with such discharge.

63. The apparatus of claim 62, wherein the strain-responsive sensor comprises an electrical resistance strain gauge assembly including one or more strain-measuring grids.

64. The apparatus of claim 63, wherein the pressure monitor is connected to a radio-frequency transponder for remote transmission of said pressure-indicative response of said strain-responsive sensor.

65. A method of monitoring pressure of a fluid in a vessel during use or operation involving discharge of fluid from the vessel, wherein said vessel comprises a closed, sealed fluid storage and dispensing vessel adapted to be removably coupled with a fluid-using process unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel.

66. The method of claim 65, wherein the step of sensing strain of a wall of the vessel comprises use of a component selected from the group consisting of electrical resistance strain gauges, piezoelectric elements, strain-sensitive colorimetric elements, and strain-sensitive matrices containing a latent strain-activated chemical reactant.

67. The method of claim 65, wherein the step of sensing strain of a wall of the vessel comprises disposing on an exterior surface of the wall of the vessel an electrical resistance strain gauge assembly.

68. The method of claim 67, wherein said electrical resistance strain gauge assembly comprises one or more strain-measuring grids.

69. The method of claim 68, wherein said strain-measuring grid comprises a layer of conductive material.

70. The method of claim 69, wherein electrical resistance of said conductive material is temperature-independent.

71. The method of claim 69, wherein the strain-measuring grid further comprises a layer of base material beneath said layer of conductive material.

72. The method of claim 68, wherein the electrical resistance strain gauge assembly comprises a Wheatstone bridge circuit for measuring resistance change of said one or more strain-measuring grids.

73. The method of claim 72, wherein the Wheatstone bridge circuit includes one strain-measuring grid.

74. The method of claim 72, wherein the Wheatstone bridge circuit includes two strain-measuring grids.

75. The method of claim 72, wherein the Wheatstone bridge circuit includes four strain-measuring grids.

76. The method of claim 67, wherein the vessel is vertically upstanding and the electrical resistance strain gauge assembly is mounted on a side wall of the vessel.

77. The method of claim 67, wherein the electrical resistance strain gauge assembly is mounted to the exterior surface of the vessel by a mounting means.

78. The method of claim 77, wherein said mounting means comprises a removable clamp.

79. The method of claim 67, wherein the electrical resistance strain gauge assembly is mounted on a band member that is removably secured to an exterior surface of the vessel.

80. The method of claim 79, wherein said band member comprises an elastic material selected from the group consisting of metals and polymers.

81. The method of claim 79, wherein said band member comprises an annular ring circumferentially extended around the exterior surface of the vessel.

82. The method of claim 79, wherein said band member comprises an elongated strip longitudinally mounted to the exterior surface of the vessel.

83. The method of claim 79, wherein said band member comprises:
  one or more annular rings circumferentially extended around the exterior surface of the vessel; and
  one or more elongated strips longitudinally mounted to the exterior surface of the vessel,
wherein said annular rings and elongated strips intersect each other at one or more intersecting locations, and wherein the electrical resistance strain gauge assembly is mounted on the band member at said one or more intersecting locations.

84. The method of claim 65, further comprising a step of converting the output correlative of the strain of the wall of the vessel into a quantitative value of pressure of fluid in the vessel.

85. The method of claim 65, wherein said output is visually displayed.

86. The method of claim 65, wherein the vessel has a valve head assembly mounted thereon and leak-tightly sealed thereto.

87. The method of claim 86, wherein the valve head assembly comprises a discharge port.

88. The method of claim 87, wherein the valve head assembly comprises a fill port.

89. The method of claim 86, wherein the vessel contains a regulator assembly mounted therein such that fluid discharged from the vessel flows through the regulator assembly, at a pressure determined by a pressure set point of the regulator assembly, prior to flow of the fluid through the valve head assembly.

90. The method of claim 65, wherein the wall of the vessel is formed of a material selected from the group consisting of metals, gas-impermeable plastics, fiber-resin composite materials, and combinations comprising two or more of the foregoing.

91. The method of claim 65, wherein the vessel is joined in fluid flow feed relationship with a fluid-consuming process unit.

92. The method of claim 91, wherein the fluid-consuming process unit comprises a semiconductor manufacturing facility.

93. The method of claim 65, wherein the vessel has a valve head assembly mounted thereon and leak-tightly sealed thereto, and wherein the valve head assembly comprises a valve head body containing a flow control valve therein, and means for opening or closing said flow control valve.

94. The method of claim 93, wherein said means for opening or closing said flow control valve, comprise an element selected from the group consisting of hand wheel valve actuation elements, pneumatic valve actuators, and electromechanical valve actuators.

95. The method of claim 65, wherein the fluid comprises a liquid.

96. The method of claim 65, wherein the fluid comprises a liquefied gas.

97. The method of claim 65, wherein the fluid comprises a compressed gas.

98. The method of claim 65, wherein the fluid comprises a hydride fluid.

99. The method of claim 98, wherein the hydride fluid comprises a fluid selected from the group consisting of arsine, phosphine, stibine, silane, halogenated silanes and diborane.

100. The method of claim 65, wherein the fluid comprises an acid gas selected from the group consisting of hydrogen fluoride, boron trichloride, boron trifluoride, hydrogen chloride, halogenated silanes and halogenated disilanes.

101. The method of claim 65, wherein the vessel contains a physical adsorbent material having sorptive affinity for said fluid.

102. The method of claim 101, wherein said physical adsorbent material is capable of selectively dispensing said gases by pressure differential desorption.

103. The system of claim 101, wherein said physical adsorbent material stores said fluid at an internal pressure within the range from about 1 torr to about 1000 torr.

104. A method of monitoring pressure of a fluid in a vessel during use or operation involving discharge of fluid from the vessel, wherein said vessel comprises a closed, sealed fluid storage and dispensing vessel adapted to be removably coupled with a fluid-using process unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:
  sensing strain of a wall of said vessel; and
  generating an output indicative of pressure of the fluid in the vessel correlative to the sensed strain of said wall of said vessel,
  wherein the step of sensing strain of a wall of the vessel comprises disposing on an exterior surface of the wall of the vessel an electrical resistance strain gauge assembly that comprises one or more strain-measuring grids, wherein said strain-measuring grid comprises a layer of conductive material, and wherein said conductive material comprises metal or metal alloy.

105. The method of claim 104, wherein said conductive material comprises copper-nickel alloy containing 45%–60% copper and 40%–55% nickel by weight, based on total weight of the alloy.

106. A method of monitoring pressure of a fluid in a vessel during use or operation involving discharge of fluid from the vessel, wherein said vessel comprises a closed, sealed fluid storage and dispensing vessel adapted to be removably coupled with a fluid-using process unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein the step of sensing strain of a wall of the vessel comprises disposing on an exterior surface of the wall of the vessel an electrical resistance strain gauge assembly that comprises one or more strain-measuring grids, wherein said strain-measuring grid comprises a layer of conductive material and a layer of base material beneath said layer of conductive material, and wherein the base material has high temperature-resistance and elastic character.

107. The method of claim 106, wherein the base material comprises polyimide.

108. A method of monitoring pressure of a fluid in a vessel during use or operation involving discharge of fluid from the vessel, wherein said vessel comprises a closed, sealed fluid storage and dispensing vessel adapted to be removably coupled with a fluid-using processing unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein said output is audibly outputted.

109. A method of monitoring pressure of a fluid in a vessel during use or operation involving discharge of fluid from the vessel, wherein said vessel comprises a closed, sealed fluid storage and dispensing vessel adapted to be removably coupled with a fluid-using processing unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein the pressure of the fluid is continuously monitored.

110. A method of monitoring pressure of a fluid in a vessel during use or operation involving discharge of fluid from the vessel, wherein said vessel comprises a closed, sealed fluid storage and dispensing vessel adapted to be removably coupled with a fluid-using processing unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein the pressure of the fluid is intermittently monitored.

111. A method of monitoring pressure of a fluid in a vessel during use or operation involving discharge of fluid from the vessel, wherein said vessel comprises a closed, sealed fluid storage and dispensing vessel adapted to be removably coupled with a fluid-using processing unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein the output indicative of pressure of the fluid is remotely transmitted.

112. The method of claim 111, wherein the output indicative of pressure of the fluid is transmitted by a radio-frequency transponder.

113. The method of claim 111, wherein the radio-frequency transponder comprises:

at least one transmitter attached to the pressure monitor of the vessel for translating the pressure-indicative response of the strain-responsive sensor into radio-frequency signals; and at least one receiver for remotely receiving the radio-frequency signals transmitted by the transmitter.

114. The method of claim 113, wherein the radio-frequency transponder further comprises at least one microprocessor for interpreting the radio-frequency signals received by the receiver.

115. The method of claim 114, wherein the radio-frequency transponder further comprises a displaying means connected to the microprocessor for displaying the pressure-indicative response transmitted by said radio-frequency transponder.

116. The method of claim 115, wherein the displaying means is selected from the group consisting of a visual display and an audible display.

117. The method of claim 113, wherein the radio-frequency transponder system comprises multiple transmitters.

118. The method of claim 113, wherein the radio-frequency transponder system is connected to a computerized information system.

119. The method of claim 118, wherein said computerized information system comprises a computer network with multiple terminals, and wherein each terminal receives data inputs from at least one radio-frequency transponder system.

120. A method of monitoring pressure of a fluid in a vessel during use or operation involving discharge of fluid from the vessel, wherein said vessel comprises a closed, sealed fluid storage and dispensing vessel adapted to be removably coupled with a fluid-using process unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein the step of sensing strain of a wall of the vessel comprises disposing on an exterior surface of the wall of the vessel an electrical resistance strain gauge assembly, at a location where said wall has a lowest wall thickness.

121. The method of claim 120, wherein the electrical resistance strain gauge assembly is mounted on an exterior side wall of the vessel.

122. A method of monitoring pressure of a fluid in a vessel during use or operation involving discharge of fluid from the vessel, wherein said vessel comprises a closed, sealed fluid storage and dispensing vessel adapted to be removably coupled with a fluid-using process unit, with means joined to the vessel for selectively dispensing fluid from the vessel to the fluid-using process unit for use therein, and with said vessel being adapted for uncoupling from the process unit and change-out of the vessel when fluid in the vessel is exhausted, said method comprising:

sensing strain of a wall of said vessel; and generating an output indicative of pressure of the fluid in the vessel correlative to the sensed strain of said wall of said vessel, wherein the step of sensing strain of a wall of the vessel comprises mounting onto an exterior surface of the wall of the vessel an electrical resistance strain gauge assembly, using an adhesive material.

123. A method of fluid management, comprising:

confining a fluid in a closed, sealed, fluid storage and dispensing vessel adapted to be removably coupled with a fluid-using process unit, said vessel including a vessel wall enclosing an interior volume for holding the fluid, wherein the vessel includes a fluid discharge port for discharging fluid from the vessel, and a pressure regulating element in the interior volume of the fluid storage and dispensing vessel, arranged to flow fluid therethrough to the fluid discharge port at a set pressure for dispensing thereof, with means joined to the fluid discharge port for selectively dispensing fluid to the fluid-using process unit for use therein, with said vessel being adapted for uncoupling from the process unit and change-out of the vessel when fluid in the vessel is exhausted;

sensing strain of said vessel wall; and generating an output indicative of pressure of the fluid in the vessel correlative to the sensed strain of said vessel wall.

124. A fluid confinement system, comprising:

a fluid confinement structure comprising a closed, sealed fluid storage and dispensing vessel adapted to be removably coupled with a fluid-using process unit, said vessel including a vessel wall enclosing an interior volume for holding the fluid, wherein the vessel includes a fluid discharge port for discharging fluid from the vessel, with means joined to the fluid discharge port for selectively dispensing fluid to the fluid-using process unit for use therein, with said vessel being adapted for uncoupling from the process unit and change-out of the vessel when fluid in the vessel is exhausted;

said wall having a first surface in contact with the fluid, and a second surface not in contact with the fluid, said second surface being separated from the first surface by a wall thickness therebetween; and a pressure monitor including a strain-responsive sensor disposed on said second surface of said wall and arranged to output a response correlative to pressure of the fluid in contact with the first surface of said wall.

125. A method of monitoring pressure of a fluid confined by a confinement structure including a wall having a first surface in contact with the fluid, and a second surface not in contact with the fluid, said second surface being separated from the first surface by a wall thickness therebetween, wherein said confinement structure includes a closed, sealed fluid storage and dispensing vessel adapted to be removably coupled with a fluid-using process unit, said wall enclosing an interior volume for holding the fluid, with means joined to the vessel for selectively dispensing fluid to the fluid-using process unit for use therein, with said vessel being adapted for uncoupling from the process unit and change-out of the vessel when fluid in the vessel is exhausted, said method comprising sensing strain of said wall at said second surface and outputting a response correlative to pressure of the fluid in contact with the first surface of said wall.

126. A fluid storage and delivery system, comprising:

a closed, sealed fluid storage and dispensing vessel adapted to be removably coupled with a fluid-using semiconductor manufacturing process unit, said vessel being constructed and arranged to retain a fluid therein for use in said semiconductor manufacturing process unit, with a valve head on the vessel and a flow control valve in the valve head, for selectively dispensing fluid from the vessel to the process unit for use in said process unit, with said vessel being adapted for uncoupling from the process unit and change-out of the vessel when fluid in the vessel is exhausted;

said vessel including a vessel wall with an interior surface in contact with the fluid contained in the vessel, and an exterior surface;

a fluid regulator assembly internally disposed in said vessel so that fluid dispensed from the vessel flows through the regulator assembly prior to flow through said flow control valve; and a pressure monitor including a strain-responsive sensor disposed on the exterior surface of said vessel, for generating a pressure-indicative response correlative of pressure of fluid in the vessel, whereby pressure can be monitored as fluid is discharged from the vessel and pressure of the fluid in the vessel correspondingly changes with such discharge;

said strain-responsive sensor comprising a bridge circuit including a plurality of measuring grids, comprising a first measuring grid mounted to the exterior surface of said vessel so as to be subject to both strain and temperature changes of the vessel wall, and at least one other measuring grid mounted to the exterior surface of said vessel so as to be (i) subject to the same temperature changes of the vessel wall as the first measuring grid but (ii) not subject to strain changes of the vessel wall, whereby the first measuring grid exhibits a resistance change due to temperature change that is compensated by resistance change of said at least one other measuring grid, but whereby resistance change of the first measuring grid caused by true strain is not affected by said at least one other measuring grid, and whereby the pressure-indicative response of said strain-responsive sensor reflects only change due to true strain changes of the vessel wall.

127. The fluid storage and delivery system of claim 126, wherein the strain-responsive sensor comprises two measuring grids in a half bridge configuration.

128. The fluid storage and delivery system of claim 126, wherein the strain-responsive sensor comprises four measuring grids in a full bridge configuration.

129. A fluid storage and delivery system, comprising:

a closed, sealed fluid storage and dispensing vessel adapted to be removably coupled with a fluid-using semiconductor manufacturing process unit, said vessel being constructed and arranged to retain a fluid therein for use in said semiconductor manufacturing process unit, with a valve head on the vessel and a flow control valve in the valve head, for selectively dispensing fluid from the vessel to the process unit for use in said process unit, with said vessel being adapted for uncoupling from the process unit and change-out of the vessel when fluid in the vessel is exhausted;

said vessel including a vessel wall with an interior surface in contact with the fluid contained in the vessel, and an exterior surface;

a fluid regulator assembly internally disposed in said vessel so that fluid dispensed from the vessel flows through the regulator assembly prior to flow through said flow control valve; and a pressure monitor assembly disposed on the exterior surface of said vessel, said pressure monitor assembly including a strain-responsive sensor for sensing strain indicative of pressure of fluid in the vessel, and a display module operatively coupled to the strain-responsive sensor for providing a corresponding pressure output, whereby pressure can be monitored as fluid is discharged from the vessel and pressure of the fluid in the vessel correspondingly changes with such discharge.

130. A fluid storage and delivery system according to claim 129, wherein said fluid storage and dispensing vessel is removably coupled with said fluid-using semiconductor manufacturing process unit.

131. A fluid storage and delivery system according to claim 129, wherein said display module pressure output is a visual numerical pressure value.

132. A fluid storage and delivery system according to claim 129, wherein said display module pressure output comprises a colorimetric output indicative of pressure level.

133. A fluid storage and delivery system according to claim 129, wherein said display module pressure output comprises an audible alarm.

134. A fluid storage and delivery system according to claim 129, wherein said display module pressure output comprises a wireless signal for remote monitoring of pressure in the vessel.

135. A fluid storage and delivery system according to claim 134, wherein said display module pressure output is remotely monitored by monitoring means monitoring a multiplicity of vessels including said vessel.

136. A fluid storage and delivery system according to claim 135, wherein said monitoring means is selected from the group consisting of intranets, local area networks, wide area networks, World Wide Web, and personal digital assistants.

137. A fluid storage and delivery system according to claim 135, wherein output from the display module includes an output of remaining service life of the vessel to exhaustion of fluid therein, and/or estimated date and/or time of said exhaustion of fluid.

* * * * *